(12) United States Patent
Koebel et al.

(10) Patent No.: US 12,398,240 B2
(45) Date of Patent: Aug. 26, 2025

(54) SILOXANE BASED POLYMERIC LIQUID MATERIAL AND METHOD FOR PREPARING THE SAME

(71) Applicant: EMPA EIDGENOSSISCHE MATERIALPRUFUNGSUND FORSCHUNGSANSTALT, Dubendorf (CH)

(72) Inventors: Matthias Koebel, Bruttisellen (CH); Ana Stojanovic, Dubendorf (CH); Lukas Huber, Dubendorf (CH); Gabriel Mcmannis, Dubendorf (CH)

(73) Assignee: EMPA EIDGENOSSISCHE MATERIALPRUFUNGSUND FORSCHUNGSANSTALT, Dubendorf (CH)

( * ) Notice: Subject to any disclaimer, the term of this patent is extended or adjusted under 35 U.S.C. 154(b) by 745 days.

(21) Appl. No.: 17/784,513

(22) PCT Filed: Dec. 7, 2020

(86) PCT No.: PCT/EP2020/084925
§ 371 (c)(1),
(2) Date: Jun. 10, 2022

(87) PCT Pub. No.: WO2021/116035
PCT Pub. Date: Jun. 17, 2021

(65) Prior Publication Data
US 2023/0099527 A1    Mar. 30, 2023

(30) Foreign Application Priority Data

Dec. 11, 2019 (EP) ................................ 19215244
Jan. 17, 2020 (EP) ................................ 20152553

(51) Int. Cl.
*C08G 77/18* (2006.01)
*C08G 77/00* (2006.01)

(52) U.S. Cl.
CPC .............. *C08G 77/18* (2013.01); *C08G 77/70* (2013.01)

(58) Field of Classification Search
CPC ........................................................ C08G 7/18
(Continued)

(56) References Cited

U.S. PATENT DOCUMENTS 5,733,644 A    3/1998  Tanaka et al.
10,208,164 B2 * 2/2019  Dogen ................. H10H 20/854
(Continued)

FOREIGN PATENT DOCUMENTS

CN    104327269 A    2/2015
CN    110606990 A    12/2019
(Continued)

OTHER PUBLICATIONS

International Search Report and Written Opinion for PCT/EP2020/084925, dated Mar. 12, 2021.
(Continued)

*Primary Examiner* — Margaret G Moore
(74) *Attorney, Agent, or Firm* — Bryan D. Zerhusen; Nicholas R. Herrel; CANTOR COLBURN LLP

(57) ABSTRACT

A new class of liquid polysiloxane materials obtainable from cost-effective commodity precursors allow tailoring a plurality of (multi)-functional properties. The materials are classified in terms of their chemical identity, which comprises Q-type non-organofunctional, T-type monoorganofunctional and optional D-type diorganofunctional moieties. The T-type organofunctional species within a polymeric MBB can be present in various preferred combinations defined by spatial, stereochemical and compositional fac-
(Continued)

tors. The corresponding method of production for the liquid polymeric polysiloxanes involves a scalable, non-hydrolytic acetic anhydride method either in a simple one-step format to create statistically distributed "core-only" hyperbranched poly-alkoxysiloxanes or as a two- or multistep process to create "core-shell" materials.

17 Claims, 9 Drawing Sheets

(58) Field of Classification Search
USPC .......................................................... 528/39
See application file for complete search history.

(56) References Cited

U.S. PATENT DOCUMENTS

| 11,965,063 | B2* | 4/2024 | Koebel | C08G 77/24 |
|---|---|---|---|---|
| 2016/0075918 | A1* | 3/2016 | Bögershausen | C09D 183/06 |
| | | | | 524/588 |
| 2020/0010725 | A1* | 1/2020 | Kotake | C09D 7/70 |
| 2023/0037620 | A1* | 2/2023 | Koebel | C08G 77/30 |
| 2023/0047845 | A1* | 2/2023 | Fu | C09D 183/04 |
| 2023/0348285 | A1* | 11/2023 | Numrich | C01B 33/152 |

FOREIGN PATENT DOCUMENTS

| CN | 112625244 A | 4/2021 |
|---|---|---|
| EP | 0728793 A1 | 8/1996 |
| EP | 0518057 B1 | 7/1998 |
| EP | 1510520 A1 | 3/2005 |
| EP | 1978055 A1 | 10/2008 |
| EP | 3498671 A1 | 6/2019 |
| EP | 3578591 A1 | 12/2019 |
| JP | 2003012803 A | 1/2003 |
| JP | 2003049113 A | 2/2003 |
| JP | 2012184297 A | 9/2012 |
| JP | 5306338 B2 | 7/2013 |
| JP | 2017132879 A | 8/2017 |
| WO | WO 2000/040640 A1 | 7/2000 |
| WO | WO 2004/058859 A1 | 7/2004 |
| WO | 2012077770 A1 | 6/2012 |
| WO | WO 2014/187972 A1 | 11/2014 |
| WO | 2019234062 A1 | 12/2019 |
| WO | 2021115646 A1 | 6/2021 |
| WO | 2022058059 A1 | 3/2022 |

OTHER PUBLICATIONS

Xiaomin Zhu, et al., One-pot synthesis of hyperbranched polyethoxysiloxanes, Macromolecules, vol. 39, Feb. 11, 2006 (Feb. 11, 2006), pp. 1701-1708, XP002798999.

Banerjee, M., et al., Enhanced antibacterial activity of bimetallic gold-silver core-shell anoparticles at low silver concentration, Nanoscale, Sep. 2011, vol. 3 pp. 5120-5125.

Bradley, BN., et al., Niobium and Tantalum Mixed Alkoxides, J. Chem. Soc., Jan. 1958, 99-101.

Chruscie, JJ., et al., Synthesis, Characterization and Microstructure of New Liquid Poly(methylhydrosiloxanes) Containing Branching Units SiO 4/2, Polymers 2018, 10, 484, Apr. 28, 2018.

Jaumann, M., et al., Hyperbranched Polyalkoxysiloxanes via AB3-Type Monomers, Macromol. Chem Phys, Feb. 2003, vol. 204, pp. 1014-1026.

Lei, X., et al., Hyperbranched polysiloxane (HBPSi)-based polyimide films with ultralow dielectric permittivity, desirable mechanical and thermal properties, J. Mater. Chem. C, 2016, 4, 2134-2146, Jan. 11, 2016.

Schartl, W., Current directions in core-shell nanoparticle design, Nanoscale, Mar. 2010, vol. 2, pp. 829-843.

* cited by examiner

SILOXANE BASED POLYMERIC LIQUID MATERIAL AND METHOD FOR PREPARING THE SAME

CROSS-REFERENCE TO RELATED APPLICATIONS

The present application is a National Stage Entry of PCT/EP2020/084925, filed 7 Dec. 2020, published as WO 2021/116035 A1, which claims the benefit of and priority to EP Application Serial No. 19215244.5, filed 11 Dec. 2019, and EP Application Serial No. 20152553.2, filed 17 Jan. 2020, each of which is incorporated herein by reference in its entirety.

FIELD OF THE INVENTION

The invention generally relates to a siloxane based polymeric liquid material, to a method for preparing the same and to materials made therefrom.

BACKGROUND OF THE INVENTION

Nanotechnology has reached broad technical and commercial impact on our daily lives over the past decades. Yet, despite good progress in preparative techniques, many nanomaterial synthesis protocols either offer limited control over the nanoparticle substructure, are not industrially scalable or both. A general approach to controlled "substructuring" of nanomaterials and eventually towards significant property improvements is to employ precisely engineered molecular building blocks as a precursor for nanomaterial synthesis. FIG. 1 shows a rough classification of Molecular Building Blocks (MBBs) and Nanoscale Building Blocks (NBBs) in terms of size. As far as organosiloxane MBBs are concerned, also depending on their chemistry and compactness, they are often liquids under ambient conditions. This is a clear distinguishing feature from the classical nanomaterials that are solids at room temperature and composed of tens of thousands to many millions of atoms. As indicated in the figure, there is no sharp boundary between those material classes and some overlap around 1 nm.

According to IUPAC, nanotechnology deals with novel materials with dimensions in the size range from approximately 1 nm to 100 nm with structure, properties and interactions that can be quite different from macroscopic materials. The so-called bottom-up approach, where molecular precursors used to create nanoscale building blocks (NBBs) such as nanoparticles etc. by means of chemical reactions offers maximum flexibility for controlling new functionality and final material properties. In this particular area of technology, the assembly of NBBs is commonly starting from atomic or small molecule precursors. Typical examples include

- polymer nanoparticles prepared from organic monomers by emulsion polymerization,
- noble metal nano-objects obtained from corresponding salt precursors in solution by chemical reduction,
- (semi)metal oxide nanoparticles or "colloidal sols" synthesized from corresponding (semi)metal salts or small molecule organometallic precursors such as alkoxides, acetylacetonates etc.

As mentioned earlier, there is increasing focus from both research and industry in targeting the controlled bottom-up synthesis of novel functional materials at the molecular level by precisely controlling structure formation steps at the interface between small molecule and nano- or even macroscale. In the case of metal organic frameworks (MOFs) for example, molecular interactions are specifically chosen and designed to combine organic and metal/metal oxide precursors in such a way that macroscopically large, crystalline compounds with molecular level control are obtained. Clearly, this molecular design approach grants access to an unprecedented diversity of material properties. Similar concepts pursued in colloidal chemistry and polymer chemistry are at the forefront of today's materials science.

In the state of the art, introducing specific chemical functionality in both, MBBs or NBBs, is achieved by either introducing the function bearing species throughout the entirety of the building block or by selective grafting onto the surface of a core block. In nanotechnology, the term core-shell describes a nanoobject where a core is overgrown with a layer of a second—often function bearing—compound. In molecular and polymer science, the term core-shell is not well established, however given the strong analogy, we are here extending the "core-shell" terminology to MBBs and hyperbranched siloxane polymer science.

Organic/inorganic hybrid materials and NBBs, particularly of the polysiloxane variety, are obtainable through a rich variety of preparative techniques. Sol-gel technology for example operates in liquid solution, starting from a colloidal suspension of molecular or oligomeric precursors resulting in the spontaneous formation of nanoparticle building blocks. On the one hand, sols can be prepared in-situ from olation and condensation reactions of oligomeric polyhydroxysilicates (e.g. silicic acid oligomers) through control of solvent, pH and so on. Such nanoparticulate sols find use as classical NBBs to create porous metal oxide and hybrid materials using solution-based soft chemistry methods. The more widely adapted route to metal oxide sols is from silicon alkoxides such as tetraethoxysilane (TEOS), tetramethoxysilane (TMOS) etc. in their respective parent alcohols and water as a reactant. In a first step, hydrolysis of alkoxy groups leads to silanol (SiOH) species, which then condense to form the amorphous metal oxide NBB or sol. Given the nature of the reversible interplay between condensation of M-OH and hydrolysis of M-O-M bonds, the obtained material morphology is difficult to control but strongly affected by pH, precursor concentration and solvent system. The preparation of colloidal sols using hydrolytic methods is always a compromise between avoiding gelation, achieving a high degree of branching and reducing the amount of volatile monomer fractions. Branched siloxane compounds with low molecular weight are obtained by acid catalyzed hydrolysis in neat systems (solvent free) as described in EP 1510520 A1.

The preparation of organically modified colloidal silica sols with a uniform and controlled structure such as for example a perfectly statistically mixed polycondensate of TEOS and a second, organofunctional silane is by no means a straightforward and often impossible task. Similarly, the chemical synthesis of core-shell NBBs containing a functional silane shell layer selectively deposited onto the TEOS based polysiloxane core is rendered virtually impossible by the fact that hydrolysis and condensation kinetics of different silanes (TEOS vs. the functional silane) are often vastly different, leading to stochastic co-condensation characteristics and poor surface selectivity of the deposition. This is shown schematically in FIG. 2 and holds particularly true for the simultaneous "one-pot" hydrolysis and condensation of two different silane compounds: Typically there is a clear preference for forming a heterogeneous mixture of "silane "A" and "silane B" particles rather than pure phase hybrid "AB" particles with a homogeneous, statistically mixed composition.

To improve on the deposition selectivity of functional shells on NBBs, slowing down the reaction kinetics is often the only choice. EP 1978055 A1 describes the functionalization of commercial "Ludox" silica particles and similar colloids with a shell made of functional organosilanes in dilute aqueous solution by slow dosing of the functional silane and at a pH of 4 where the hydrolysis/condensation kinetics are very slow—the reaction mixture is allowed to react for a period of 24 h at room temperature. Such a process is however economically quite disadvantageous given the slow reaction rate and the necessity to work in very dilute systems which further necessitates handling and recycling of large volumes of solvent.

In the world of organosiloxane based MBBs, hyperbranched poly-alkoxysiloxanes (hyPASs) are amongst the most promising candidates to afford both functionality and size control in one and the same molecule. hyPASs are small molecular building blocks with typical molecular weights ranging from 500 to 50'000 g/mol, spanning a size range from several Angstroms to a few nanometers. Especially higher molecular weight hyPAS cannot be produced using the classical hydrolytic silane chemistry, but are most commonly prepared by "non-hydrolytic" methods meaning that the polycondensation reactions used to bond precursors in monomeric or oligomeric form together to larger, macromolecular MBBs can be controlled by stoichiometric addition of the reactants involved in said polycondensation chemistry. Consequently, such a stoichiometrically controlled reaction can also be started, stopped and resumed at any given point in time simply by controlling the dosing/addition protocol of these reagents. The amount of new siloxane bonds and thus the degree of polymerization of the final material can therefore be precisely controlled by the stoichiometric factors. Furthermore, the synthesis can be carried out "neat", that means in absence of additional solvents like water or alcohols, making it more economically appealing. Because of their close to spherical and compact nature, hyPASs exhibit lower melt viscosities and a much greater solubility than their linear polymer analogues. The classical preparative "non-hydrolytic" synthesis routes for single component hyPASs are:

1) Condensation of hydroxides obtained by reaction of an alkoxysilane with an alkali hydroxide (silanol route)
2) Condensation of chlorides with alkoxysilanes (chloride route)
3) Condensation of a single alkoxysilane with itself by ether elimination
4) Condensation of an acetoxyfuctional alkoxysilane with itself by elimination of the corresponding acetic acid ester (acetoxy route)
5) Condensation of alkoxysilanes by reaction with acetic anhydride in presence of a suitable catalyst by acetic acid ester elimination (anhydride route).

Method 1) is rather impractical since it requires quantitative amounts of strongly caustic alkali hydroxides and recuperating and disposing of the corresponding waste products.

Method 2) is described in EP 0728793 A1, where the preparation of hyperbranched polysiloxanes proceeds through heterocondensation of chloro—and alkoxysilanes through alkyl halide elimination. The reaction is catalyzed by Ti, V and Zr containing organometallic compounds. Industrial commercialization is limited because of the highly corrosive nature of the chlorosilane reagents.

Method 3) bears large safety related hazards in an industrial setting due to the formation of dialkyl ethers with very low boiling points and extreme flammability. Furthermore, such a homo-condensation of alkoxides is not self-limiting by the consumption of a second, stoichiometrically limiting species such as chloro-, hydroxy- or acetoxy-silanes and thus will need to be stopped by thermal quenching at an arbitrary point in time without precise knowledge of the reaction progress, thus making product control much more challenging.

Method 4) generally uses rather costly acetoxysilanes. WO 00/40640 A1 describes the preparation of lightly branched organosilicon compounds through acetoxy derivatization starting from dimethylsiloxane prepolymers which are crosslinked using trifunctional silanes. The patent further describes the usefulness of the classic acetoxy route when only a few condensation bonds need to be made i.e. when connecting monomeric with oligomeric/polymeric building blocks to create larger macromolecules. This can be done for example by refluxing silanol terminated prepolymers with alkoxy terminated crosslinkers in the presence of acetic acid under refluxing at elevated temperature or directly with acetoxy-terminated crosslinkers (e.g. triacetoxysilanes).

Method 5) was recently invented by Moeller et al. (e.g. Macromolecules 2006, 39, 1701-1708)—it is today the most advanced technique for hyPAS preparation in terms of scalability, process safety and ease of implementation. It offers drastically improved commercialization potential over 1) through 4) and the closest state of the art to this invention but at the same time fails to address the of controlled assembly of hybrid functional hyPASs. The corresponding patent application WO 2004/058859 A1 limits itself to the preparation of single component hyPAS MBBs by means of the anhydride route: In the examples, the authors discuss the one-step preparation of pure silicate and titanate polyalkoxymetallates from their respective alkoxides but others, specifically zirconates and hafnates, are also mentioned. The same patent further describes the analogous preparation of single component T-type organofunctional hyPASs prepared from organofunctional-trialkoxysilanes, specifically from methyltriethoxysilane (MTES) and heptadecafluoro-(1,1,2,2)-tetrahydrodecyltriethoxysilane in later examples. Importantly, mixed non-functional/functional polycondensates (Q-type with T-type e.g. TEOS/MTES) are not mentioned or described.

As an extension to Moeller's original work, WO 2014/187972 A1 deals with the chemical functionalization of Silicate hyPASs prepared by Moeller's route 5) and their application as additives in coating formulations. Functional precursors are created by alcohol condensation of hydroxyl terminated polymers (preferred examples are poly-alkylene oxides such as PEG, PPG and polydimethylsiloxanes (PDMS)) with accessible alkoxy groups on a "Moeller-type" hyPAS at temperatures in the range of 130° C. In terms of bonding states, this means grafting of Q-type and D-type siloxane moieties without the presence of T-type organosilane chemistry. In this way, PEG, PPG, PDMS etc. modified core-shell-like MBBs are created, yet without the complete freedom to prepare the shell in a bottom-up manner that is with full control over composition and shell substructure.

The preparation of Q-type/T-type hybrid MBBs with tailorable functionality therefore represents an important field of opportunities. In terms commercial relevance, pricing and availability of Q-type and T-type precursors is an essential factor. Non-organofunctional Q-type ethylsilicate precursors in monomeric or oligomeric form have commodity character, while methylsilicates are commercially less relevant but still attractive. Similarly, organofunctional T-type trimethoxysilanes and triethoxysilanes have strong commodity character nowadays and are available from many global suppliers. For Q-type, ethoxysilane and for T-type methoxysilane compounds are currently the most attractive option in terms of market size, cost and availability.

SUMMARY OF THE INVENTION

It is an object of the present invention to provide improved organofunctional hybrid hyPAS materials comprising Q and T-type functionality within the same macromolecule, methods for producing the same and various applications thereof, with particular emphasis on economic viability.

According to one aspect of the invention (claim 1), there is provided a polymeric liquid hyperbranched polysiloxane material composed of:

non-organofunctional Q-type alkoxysilicate moieties

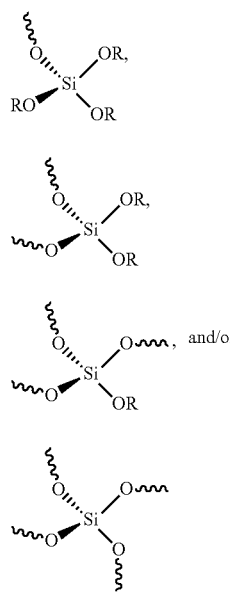

and

R' substituted mono-organofunctional T-type alkoxy terminated siloxane moieties

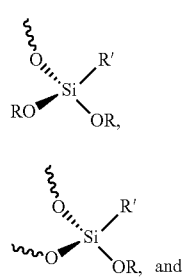

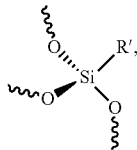

Each R group is independently methyl or ethyl, i.e. all of the alkoxy groups —OR in the polymeric liquid material are either ethoxy (—OCH$_2$—CH$_3$) or methoxy (—OCH$_3$).

Evidently, the polymeric liquid material of the present invention comprises, in addition to a principal, non-organofunctional siloxane component, an appreciable content of R' organofunctional siloxane moieties.

Regarding the functional groups of the mono-organofunctional T-type siloxane moieties, each R' is either (i) selected from the group consisting of methyl, ethyl, n-propyl, isopropyl, n-butyl, t-butyl, hexyl, octyl, dodecyl, hexadecyl, (3,3,3-trifluoro)propyl, (1H,1H, 2H, 2H-perfluoro)octyl, (1H,1H, 2H, 2H-perfluoro) dodecyl, and (1H,1H, 2H, 2Hperfluoro)hexadecyl, or (ii) selected from the group R'=L-Z, wherein L is an aliphatic linker selected from the group consisting of —CH$_2$—, —CH$_2$CH$_2$—, —CH$_2$CH$_2$CH$_2$—, —C$_6$H$_4$—, —C$_6$H$_4$—CH$_2$—, and —CH$_2$—CH$_2$-C$_6$H$_4$—CH$_2$—, and wherein Z is a functional terminus selected from the group

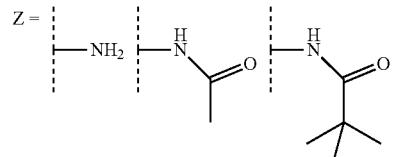

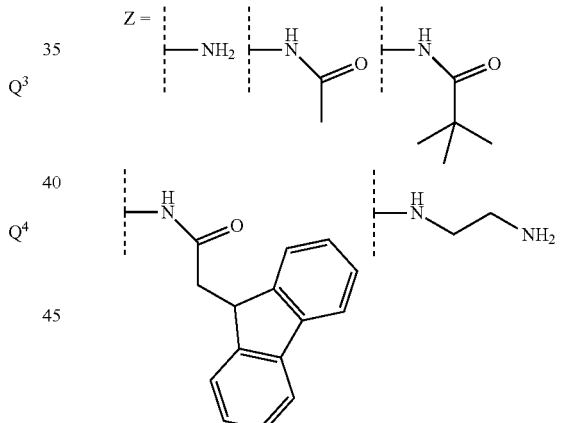

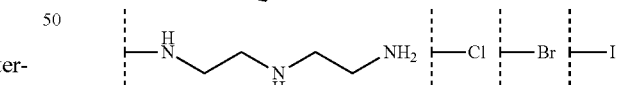

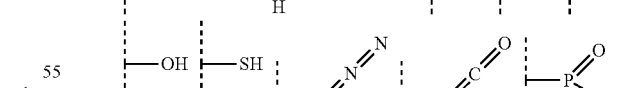

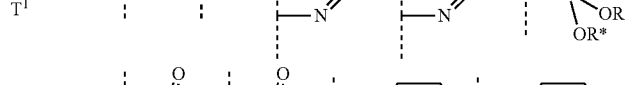

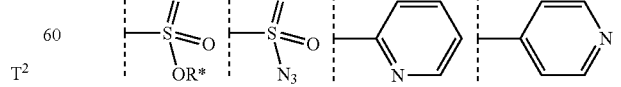

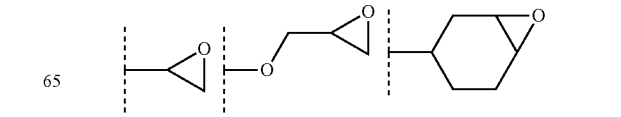

-continued

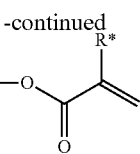

wherein R* is selected from the group consisting of —CH₃ (Me), —CH₂CH₃ (Et) and —CH₂CH₂CH₂CH₃ (Bu), or (iii) selected from the following group R' =$R_s$ of special functionality containing silane moieties:

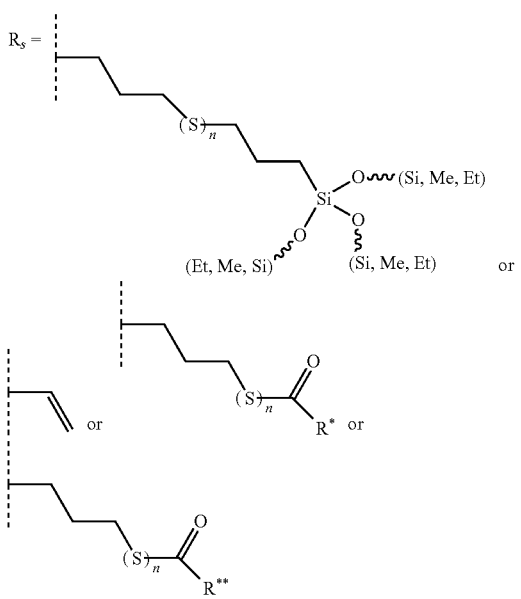

with n=1, 2, 3, 4, or 5, wherein R* is, as defined above, selected from the group consisting of —CH₃ (Me), —CH₂CH₃ (Et) and —CH₂CH₂CH₂CH₃ (Bu), and wherein R** is selected from the group consisting of —(CH₂)₅CH₃ (Hexyl), —(CH₂)₆CH₃ (Heptyl), —(CH₂)₇CH₃ (Octyl), —(CH₂)₈CH₃ (Nonyl), —(CH₂)₉CH₃ (Decyl), —(CH₂)~CH₃ (Dodecyl) and —(CH₂)₁₃CH₃ (Tetradecyl), It shall be pointed out for further reference that in the above group $R_s$ of special functionality containing silane moieties, the ones containing a further Si atom form a subclass which will be called "bipodal silanes".

The material has a degree of polymerization of the non-organofunctional Q-type moieties $DP_{Q\text{-}type}$ in the range of 1.3 to 2.7, and it has a degree of polymerization of the monoorganofunctional T-type moieties $DP_{T\text{-}type}$ in the range of 1.1 to 2.7.

Optionally, the material further contains $R_1,R_2$-substituted di-organofunctional D-type siloxane moieties

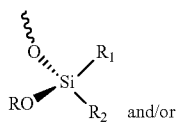 and/or

D¹

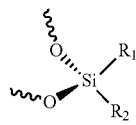

D² wherein R, and R₂ are independently selected from the group consisting of —CH₃, —C₂H₅, —C₆H₅, —C₆H₁₁, —CH=CH₂, —CH₂—CH₂—Cl and —C₅H₅, and has a degree of polymerization of the di-organofunctional D-type moieties $DP_{D\text{-}type}$ in the range of 1.0 to 1.9.

The total molar content of di-organofunctional D-type siloxane moieties in the material does not exceed 10 mol percent.

Further, the material has a viscosity in the range of 10-100'000 cP, which spans the range between moderately viscous liquids and rather highly viscous liquids.

The material contains less than 5 molar percent hydroxy moieties (Si—OH) and the total silicon to free hydrolysable alkoxy molar ratio in the material is in the range of 1:1.25 to 1:2.75.

Importantly, the total molar content of terminating ethoxy groups (—OCH₂—CH₃) is at least twice the total content of methoxy terminating units (—OCH₃).

Also, the relative atomic ratio of T to Q species in the material is in the range 0.01:1 to 1:1.

Moreover, the following conditions apply:

the material comprises at least two non-identically R'-substituted mono-organofunctional (T-type) alkoxy terminated siloxane moiety populations, each population making up at least 3 molar percent of all mono-organofunctional T-type moieties in the material and/or the material comprises chiral mono-organofunctional $T^1$-type moieties in an amount of at least 3 mol percent relative to all mono-organofunctional $T^1$-type moieties in the material.

The first condition shall be understood in the sense that the material comprises at least two populations of mono-organofunctional (T-type) alkoxy terminated siloxane moieties ($T^1$, $T^2$, $T^3$) which differ by their organofunctional substituent R'. Simply speaking, this means that the material features at least two different R' functionalities and that the minority species is present in an appreciable amount.

The second condition is met by a $T^1$-type siloxane moiety having four different substituents on its silicon atom, namely one Si—O—Si bond, one Si—C bond linking to the R' organofunctional group, and two different alkoxy substituents, namely one ethoxy and one methoxy.

As will become clearer after considering possible methods of preparation, the polymeric liquid material may or may not have a so-called core-shell architecture, wherein the core is composed of a majority of Q-type moieties and has a different composition than the shell, which is composed primarily of T-type moieties. At the same time, the polymeric liquid material can also comprise a "core-only" material, meaning that there is no shell and that Q- and T-type moieties are essentially randomly distributed within said core.

According to another aspect of the invention (claim 7), there is provided a hydrolysis product obtainable by reacting a polymeric liquid material according to the first aspect with a predetermined amount of water or with a predetermined amount of a water-solvent mixture.

According to further aspect of the invention (claim 8), there is provided an emulsion obtainable by reacting a polymeric liquid material according to the first aspect with a predetermined amount of water. Specifically, the polymeric liquid material is converted to an emulsion by mixing it in water and applying a high shear load, for example through mechanical stirring, ultrasonication or use of a high rpm homogenizer (e.g. IKA Ultra-Turrax). The use of surfactants or amphiphilic cosolvents can be advisable for certain applications. In its simplest form, the polymeric liquid material can constitute the entirety of the dispersed oil phase in case of an oil/water emulsion, yet it is also possible that other oil-soluble compounds are mixed together with the polymeric liquid material prior to the emulsification process. Given the highly functional and intrinsically non-toxic as well as biocompatible nature of many of the polymeric liquids accessible through this technology, emulsions are particularly well-suited for biotechnological, pharmaceutical and cosmetic applications.

According to yet another aspect of the invention (claim 9), a method for preparing a polymeric liquid material according to the first aspect comprises the following steps:

a) charging an amount of tetraethoxysilane, and a1) optionally adding at least one mono-organofunctional trialkoxysilane R'—Si(OR)$_3$ and a2) optionally, adding at least one di-organofunctional dialkoxysilane R$_1$—Si(OR)$_2$—R$_2$, wherein R, R', R, and R$_2$ are as defined in claim 1, in monomeric or in oligomeric form, into a reaction vessel together with a first stoichiometric amount of acetic anhydride in the presence of a catalyst;

b) heating up the reaction mixture provided in step a) in a water-free, inert atmosphere under stirring to reach a desired reaction temperature and distilling off any resulting acetic acid ester reaction side product until the reaction and the flow of distillate cease, thereby forming a polysiloxane core material;

c) optionally carrying out the steps of c1) adding at least one further mono-organofunctional trialkoxysilane R'—Si(OR)$_3$ and c2) optionally, adding at least one further di-organofunctional dialkoxysilane R$_1$—Si(OR)$_2$—R$_2$, wherein R, R', R, and R$_2$ are as defined in claim 1, in monomeric or in oligomeric form, together with a second stoichiometric amount of acetic anhydride, optionally with additional catalyst, to the hot reaction mixture formed in step b) with continuing stirring, distilling over any further acetic acid ester formed, and continuing the reaction until any distillate flow ceases again, thereby forming a functional shell layer grafted onto the core species previously prepared in step a);

d) optionally building at least one further functional shell layer by repeating the addition and reaction protocol described in step c) at least once;

e) optionally removing low-molecular reaction products and/or residual starting materials in the reaction mixture by vacuum distillation through gradually lowering the pressure inside the reaction vessel and holding a final pressure in the range of 5 to 250 mbar for a period of time between 2 and 60 minutes;

f) cooling down and isolating the polymeric liquid material thus obtained with the provision that at least one of the optional steps a1) and c1) is carried out and that stirring is carried out for at least 30 minutes at temperature after the last one of said adding steps.

The requirement of prolonged stirring shall ensure that the reaction mixture is maintained at an elevated temperature under agitated conditions for a sufficiently long time to approach an equilibrium condition in terms of T-type substituent grafting. In the above preparation method, the amount of reactants used in the various steps will be selected in accordance with the desired composition of the polymeric liquid material to be formed.

In particular, the protocol and amount of reactants will be chosen so as to meet the composition limitations defined in claim 1.

It has been found that heating up the reaction mixture provided in step a) in a water-free, inert atmosphere under stirring in the presence of a catalyst but without addition of acetic anhydride leads to a redistribution of siloxane (Si—O—Si) and alkoxysilyl (Si—O—R) bonds. During any of the T-type monomer grafting steps (either a1 or c1), Q-O-Q and Q-O-T (and to a lesser extend based on statistical presence, T-O-T) bonds are broken and rearranged by action of the catalyst alone even without acetic anhydride addition and the formation of Q-O-T bonds is statistically favored by high T-type monomer precursor concentrations. For each Q-O-T bond formed in this manner, i.e. without addition of acetic anhydride, a Q-O-Q bond has to be broken up, leaving the number of siloxane bonds in the system unchanged. An analogous type of anhydride-less reaction can also be induced in step c). The just described anhydride-less reaction can be understood as a limiting case where the stoichiometric amount of acetic anhydride in the corresponding reaction step is zero. In this way, T-type monomers can be grafted with Q-type polycondensates within a limited window of operation entirely by this type of rearrangement reactions catalyzed by the catalyst.

According to further aspects, the polymeric liquid materials or the corresponding hydrolysis product or emulsion as defined above are used for various applications as defined in claims 15 and 16.

According to one aspect (claim 15), a polymeric liquid material containing at least one T-type species with a radical polymerizable organofunctional group selected from R'=vinyl, methacrylate, butacrylate, acrylate or R' =R$_s$ is used as a crosslinker within a formulation, with a content of the polymeric liquid material in the range of 0.2% to 25% by weight with respect to the formulation. In particular, the polymeric liquid material can be used as an active crosslinker in polymer technology, specifically for reactive polymer melt extrusion such as crosslinked thermoplastics processing, or it may be used for filler crosslinking, vulcanization of rubber systems as well as in emulsion polymerization processes, that is in the preparation of polymer dispersions, wherein the loading of the polymeric liquid in such applications preferably ranges from 0.5% to 10% by weight.

According to another aspect (claim 16), a polymeric liquid material or a corresponding hydrolysis product or a corresponding emulsion containing at least one T-type species with organofunctional groups selected from R'=methyl, ethyl, vinyl, methacrylate, n-propyl, isopropyl, n-butyl, t-butyl, hexyl, octyl, dodecyl, hexadecyl, (3,3,3-trifluoro) propyl, (1H,1H, 2H, 2H-perfluoro)octyl, (1H,1H, 2H, 2H-perfluoro)dodecyl and (1H,1H, 2H, 2Hperfluoro)hexadecyl is used in a hydrophobic formulation, wherein the loading of the polymeric liquid, hydrolysis product or emulsion is 0.5% to 25% by weight within the formulation. In particular, such a hydrophobic formulation may be used for coatings, lacquers, creams, ointments, drug delivery systems, wood or paper impregnation, waterproofing of building surfaces, or as a hydrophobe for cement, gypsum, cellulose, lignin, biopolymer waste, or bioplastics.

Advantageous embodiments are defined in the dependent claims and in the following description and examples.

According to one advantageous embodiment (claim 2), the material contains less than 0.5 molar percent hydroxy moieties (Si—OH).

According to advantageous embodiments (claim 3)
the degree of polymerization of the non-organofunctional Q-type moieties $DP_{Q\text{-}type}$ is in the range of 1.5 to 2.5, and/or
the degree of polymerization of the mono-organofunctional T-type moieties $DP_{T\text{-}type}$ is in the range of 1.3 to 2.2, and/or
the degree of polymerization of the di-organofunctional D-type moieties $DP_{D\text{-}type}$ is in the range of 1.25 to 1.75.

According to a further embodiment (claim 4), the total content of terminally bonded diorganofunctional D-type siloxane moieties in the material is zero. In other words, all of the organofunctional siloxane moieties are of T-type.

According to another embodiment (claim 5), the mono-organofunctional T-type moieties comprise
a first population of mono-organofunctional T-type alkoxy terminated siloxane moieties wherein R' is selected from the group consisting of methyl, ethyl, n-propyl, isopropyl, n-butyl, t-butyl, hexyl, octyl, dodecyl, hexadecyl, (3,3,3-trifluoro)propyl, (1H,1H, 2H, 2H-perfluoro)octyl, (1H,1H, 2H, 2H-perfluoro) dodecyl and (1H,1H, 2H, 2H-perfluoro)hexadecyl, and
either a second population of mono-organofunctional T-type alkoxy terminated siloxane moieties wherein R' is selected from the group consisting of methyl, ethyl, npropyl, isopropyl, n-butyl, t-butyl, hexyl, octyl, dodecyl, hexadecyl, (3,3,3-trifluoro)propyl, (1H,1H, 2H, 2H-perfluoro)octyl, (1H,1H, 2H, 2H-perfluoro) dodecyl and (1H,1H, 2H, 2H-perfluoro)hexadecyl, wherein the second type is non-identical to the first type,
or a third population of mono-organofunctional T-type alkoxy terminated siloxane moieties, wherein R' is selected from the group R'=L-Z or wherein R' is selected from the group R' =$R_s$.

Advantageously (claim 6), the relative atomic ratio of T to Q species is in the range 0.02:1 to 0.75:1 and preferably 0.03:1 to 0.5:1.

According to one embodiment of the preparation method (claim 10), step a) comprises carrying out steps a1), and optionally a2), followed optionally by step e), and followed by step f), resulting in a core-only material with statistically mixed Q- and T-type moieties.

According to another embodiment of the preparation method (claim 11), step a) does not comprise carrying out steps a1) and a2) but instead step c) is carried out, leading to a core-shell type material.

According to a further embodiment (claim 12), the reaction temperature for steps b) through e) is in the range from 70° C. to 170° C., preferably in the range of 100° C. to 150° C. and most preferably in the range from 120° C. to 140° C. and the pressure during steps b) through d) is in the range of 0.1 bar to 2 bar, preferably in the range of 0.5 bar to 1.4 bar and most preferably in the range of 0.6 bar to 1.2 bar.

According to a still further embodiment (claim 13), acetic acid ester reaction products are removed from the system through a distillation column comprising several theoretical plates in such a way that the lower boiling reaction product is separated from higher boiling residual reactants in solution whereby the latter are continuously fed back into the reaction mixture.

Advantageously (claim 14), the catalyst
is selected from the group of Ti(OR")$_4$ and Zn(II) alkanolates Zn(OR")$_2$ wherein R"=—CH$_2$CH$_3$, —CH(CH$_3$)$_2$, —CH$_2$CH$_2$CH$_3$, —C(CH$_3$)$_3$, —CH$_2$CH$_2$CH$_2$CH$_3$
or is a dibutyl-tin(IV) compound such as dibutyltin(IV)-oxide, dibutyltin(IV)-dilaurate, dibutyltin(IV)-diacetate, dibutyltin(IV)-diacetylacetonate, dibutyltin(IV)-dioctanoate,
or is Ti(O—Si(CH$_3$)$_3$)$_4$, wherein the catalyst amount added in each of steps a) or c) is between 0.01 and 1.5% on a mol basis of total alkoxysilane precursor used in said step.

Surprisingly, it was found that the acetic anhydride reaction (i.e. Method 5) mentioned in the introduction) can be used to prepare mixed Q-type and T-type poly-alkoxysiloxanes which bear organofunctional groups that are covalently linked through the T-species. Organofunctional trialkoxysilanes are ideal precursors for introducing chemical function due to the large choice and attractive pricing of commercially available compounds, and hence, the option to carry out a cocondensation using Moeller's acetic anhydride route with multicomponent i.e. organofunctional T-type (and D-type) together with non-functional Q-type silane precursors in monomeric or oligomeric form giving access to a wide MBB design space.

Direct reaction products
are clearly macromolecular in nature with typical sizes of its constituting core-shell MBBs below 2 nm;
exhibit a statistical distribution of molecular weights with variable content of unreacted monomer and small oligomers depending on the chosen reaction conditions; lowmolecular species can be optionally removed and reused by vacuum distillation. Individual polymeric liquid materials according to this invention are primarily composed of MBBs which themselves typically contain 30 to 500 Si atoms;
have a considerable content of hydrolysable, reactively crosslinking alkoxy groups in both the core and the shell;
are essentially solvent free liquid mixtures of neat MBBs with viscosities ranging from 10-100'000 cP;
are star-polymer like in terms of the molecular structure of MBBs.

A clear differentiation from other star polymers from the known state of the art can be made in terms of the hyperbranched nature of the material, indicating a substantial degree of crosslinking inside the "core" of the material. This applies to both core-only (claim 10) and core-shell type (claim 11) materials. For the latter class of materials, there are additional degrees of freedom for the shell in terms of its size (surface coverage of the core), composition and optional multilayer architecture. Core-shell type materials contain only T-type and optionally D-type moieties in their shell and the core is primarily composed of Q-type moieties. Practically relevant formulations fall within a limited range of degree of polymerization of both Q-type ($DP_{Q\text{-}type}$=1.3-2.7) and T-type ($DP_{T\text{-}type}$=0.3-2.5) as well as optional D-type ($DP_{D\text{-}type}$=1.0-1.9) siloxane moieties.

A moiety is defined as a single silicon atom within the polysiloxane material including its adjacent sphere of covalently bonded ligands. For example, a $T^1$ moiety comprises a central silicon atom bonded to two terminal alkoxy groups (—OR), an organofunctional R'-group via a silicon-carbon bond (Si—C) as well as a siloxane (Si—O—Si) bond through which it is covalently attached to the polysiloxane network, i.e. to other Q-type, T-type (or D-type) moieties. An individual MBB that makes up the polymeric liquid material is then composed of tens to hundreds of such moieties bonded together through said polycondensation network of siloxane bonds.

Core-only materials according to claim 10 are essentially hyperbranched polysiloxanes with a statistically mixed composition of Q-type and D-type as well as optional D-type moieties.

For better referencing of the MBBs structural features, the above-mentioned term core-shell has been adopted from nanomaterials science. Concerning core-shell (claim 11) reaction products, the interface between core and shell must be understood as a diffuse shell rather than a sharp boundary at which composition changes abruptly. This diffuse shell layer architecture, where the concentration of the functional shell species varies over a few bond lengths or Angstroms, is a direct result of the condensation chemistry, that is, the grafting of a functional silane shell onto a preformed hyPAS core. Because the outer arms of the dendritic hyPAS core are highly permeable to smaller silane monomers and oligomers, it is clear that the extent of grafting of the shell is highest on the periphery but there is no sharp cutoff. Nevertheless, the term core-shell still applies as grafting in the center of the core is highly hindered for both, steric reasons and reduced availability of reactive alkoxy groups, because the average connectivity (number of bridging oxygen linkages (Si—O—Si bonds) per silicon center) in the center of the core is higher than at the core perimeter. Consequently, the term core-shell will be used in the context of polymeric liquid materials according to claim 11 in the sense of a hyPAS core with a diffuse shell according to the above argumentation.

The degree of polymerization DP for any non-crystalline silicon oxide material is defined here as the ratio of bridging oxygens BO (# of Si—O—Si bonds) to the total number of metal atoms $Si_{tot}$ in the system.

For a degree of polymerization of:
DP=4, all Si atoms are bonded to four other neighbors, i.e. this is the case in a perfect crystal (quartz) with four oxygen atoms sitting in the tetrahedral sites of each center Si and each Si atom sees exactly the same environment DP=3, on average, each Si atom is bonded to three other Si atoms through bridging oxygen linkages (Si—O—Si). If a single component were to have DP=3, its structure would be an infinitely extended two-dimensional sheet, similar to sheet like clay minerals.

DP=2, on average each Si atom is bonded through two bridging oxygen bonds. The single component analogue would be a linear polymer such as for example uncrosslinked PDMS (polydimethylsiloxane) type silicone resins.

The acetic anhydride reaction used to create the polysiloxane network is quantitative in terms of its reagents (alkoxide and acetic anhydride). Hence, the number of new bonds formed as a result of its addition and also DP are directly proportional to the stoichiometric conversion factors (f, g) as shown below:

i)
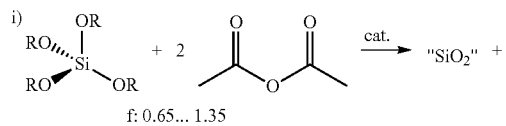
f: 0.65... 1.35

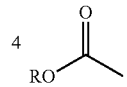
R = CH₃; CH₂CH₃ etc.
TMOS TEOS

The complete stoichiometric conversion of a Q-type silicon tetraalkoxide model compound is described in equation i). This defines the maximum theoretical stoichiometric factor f=2 which corresponds to an acetic anhydride to tetraalkoxide ratio of 2:1. Yet, this hypothetical example would lead to a practically impossible DP=4, that is complete conversion to $SiO_2$ or, in other words, all moieties in said material would be $Q^4$. In reality, f-factors above 1.35 most often lead to gelation, thus no longer qualifying as a liquid material. For the simple example of a stoichiometric factor f=1.0, a core material with a $DP_{Q\text{-}type}=2.0$ would be formed, where the average siloxane moiety would be $Q^2$. We adhere to the definition of the stoichiometric factors not as the maximum theoretically possible molar ratio given by the reaction equation but as the required molar ratio that leads to the formation of a desired number of new siloxane bonds by said acetic anhydride condensation chemistry f and g.

Mechanistically, the acetic anhydride reaction proceeds through an acetoxy intermediate with elimination of a first aliquot of acetic acid ester as shown in equation $i_a$). The acetoxy intermediate then undergoes intermolecular condensation with an alkoxy group on a second molecule under elimination of a second aliquot of acetic acid ester as shown in equation $i_b$).

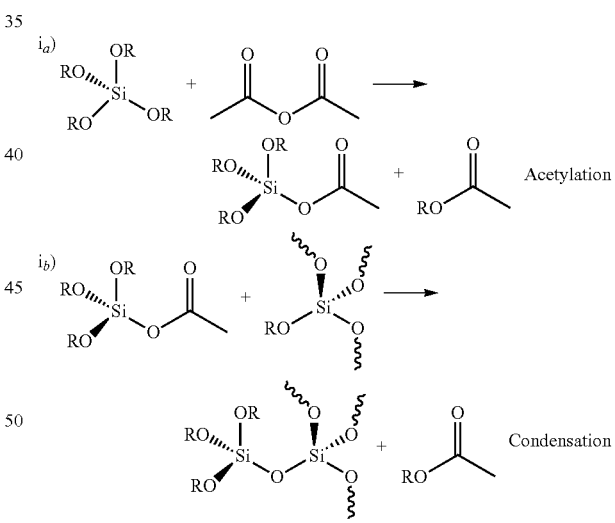

In the same fashion as Q-type tetraalkoxysilanes, and as already described in Möller's original work, T-type organofunctional trialkoxysilanes can also be converted to hyPASs using anhydride chemistry according to equation ii), ii)
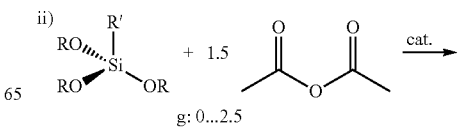
g: 0...2.5

-continued

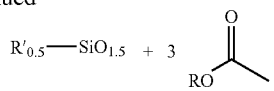

although yielding a lower $DP_{T\text{-}type}$ because of the lower number of alkoxy groups (3 instead of 4) available for condensation reactions. Mechanistically, di- and tri-alkoxysilanes react in the same way as tetraalkoxysilanes without any noticeable change in kinetic rate or selectivity.

Most silicate glasses and hyPASs feature average DP values which are significantly below their theoretical limit (full conversion of all alkoxy groups, meaning $DP_{Q\text{-}type}=4$). During preparation, theoretical DP values are given by the stoichiometric ratio used in the reaction and effective DP values can be directly determined through quantitative analysis of the acetic acid ester reaction product. Independently, $DP_{Q\text{-}type}$, $DP_{T\text{-}type}$ and $DP_{D\text{-}Type}$ of the material can be directly obtained from quantitative $^{29}$Si NMR data according to:

$$DP_{Q\text{-}type}=\Sigma(n\,A_{Qn})/\Sigma(A_{Qn})=(A_{Q1}+2A_{Q2}+3A_{Q3}+4A_{Q4})/(A_{Q0}+A_{Q1}+A_{Q2}+A_{Q3}+A_{Q4})$$

and $$DP_{T\text{-}type}=\Sigma(n\,A_{Tn})/2(A_{Tn})=(A_{T1}+2A_{T2}+3A_{T3})/(A_{T0}+A_{T1}+A_{T2}+A_{T3})$$

for general T-type silanes and $$DP_{T\text{-}type},\text{bipodal silanes}=2\cdot\Sigma(n\,A_{Tn})/2(A_{Tn})=2(A_{T1}+2A_{T2}+3A_{T3})/(A_{T0}+A_{T1}+A_{T2}+A_{T3})$$

for bipodal T-type silanes and $$DP_{D\text{-}type}=\Sigma(n\,A_{Dn})/\Sigma(A_{Dn})=(A_{D1}+2A_{D2})/(A_{D0}+A_{D1}+A_{D2})$$

In the above equation for $DP_{Q\text{-}type}$, the terms $A_{Qn}$ denote the quantitative $^{29}$Si NMR peak area related to that $Q^n$ species, which is a Si atom coordinated by n siloxane bonds through bridging oxygen (BO) atoms, that connect it to its next-nearest-neighbor Si atoms and (4-n) non-bridging oxygen (NBO) atoms which are linked to terminal alkoxy groups Si—OR. Analogously, $A_{Tn}$ and $A_{Dn}$ denote the $^{29}$Si NMR peak areas corresponding to the respective T-type and D-type moieties.

Regarding the equation for $DP_{T\text{-}type}$ it is necessary to differentiate between the special class of bipodal T-type silanes and all the other, "general" T-type silanes. The latter constitute the majority of commercially available T-type silanes and comprise only a single Si atom connected to three alkoxy and one organofunctional group. In contrast, bipodal silanes, which can be represented as $_3(RO)Si—(CH_2)—X—(CH_2)—Si(OR)_3$ contain a further trialkoxysilyl unit attached to the first one through a suitable linker group "X" and each spaced by at least one methylene ($—CH_2—$) group. The introduction of a modified definition for the degree of polymerization of bipodal silanes takes into account that a single connectivity to the polysiloxane network is sufficient to covalently attach the functional group and develop its targeted interface functionality. In fact, simultaneous grafting through both trimethoxysilyl residues of a bipodal silane is counterproductive in a sense that it quickly leads to branching and attachment from one MBB to another, leading to unwanted gelation even at low surface coverage of dipodal T-type silanes. Hence it makes more sense to reference $DP_{T\text{-}type,\,bipodal\,silanes}$ in terms of single trialkoxysilyl-attachment modality, leading to the definition given above.

For organofunctional T type tri- and D-type di-alkoxysilanes, the $^{29}$Si spectral fingerprint regions are shifted progressively further downfield allowing a clear separation of the different non-organofunctional $Q^n$ from organofunctional $T^m$ and $D^l$ moieties as seen in the two model compound spectra (FIG. 3). A zoom on the T-Type spectral region reveals further information about the bonding subpopulations of the mono-organofunctional moieties present in the materials (FIG. 4).

For any polymeric liquid material according to claim 1, there exist different modes of interconnections, namely
 i) Siloxane bonds with two Q-type partners (Q-Q homo-condensation),
 ii) Siloxane bonds with two T-type partners (T-T homo-condensation),
 iii) Siloxane bonds with two D-type partners (D-D homo-condensation),
 iii) Siloxane bonds with non-identical partners (Q-T, Q-D, T-D heterocondensation).

The concept of heterocondensation is important to understand the bonding states of both, statistical mixtures core-only as well as core-shell materials defined in claims 10 and 11, respectively, and is exemplified in equation iii) below for Q-T-type siloxane bonding:

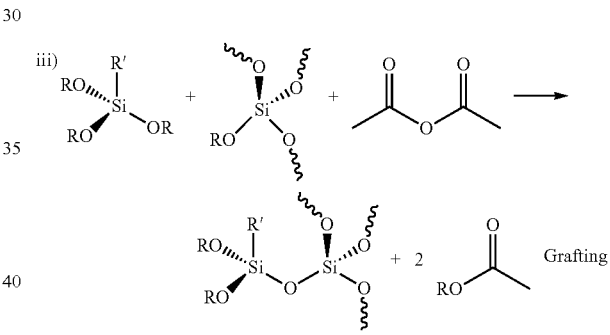

In the above example of a Q-T heterocondensation, the organofunctional trialkoxysilane is converted from $T^0$ to $T^1$ while the Q-type alkoxysilane on the left-hand side of the reaction (symbolized by the three wavy siloxane bonds) from $Q^3$ to $Q^4$, illustrating that each siloxane bond formed simultaneously increases $DP_{Q\text{-}type}$ and $DP_{T\text{-}type}$. There are obviously all sorts of other combinations of possible grafting reactions e.g. a $T^2$ species grafting onto a $Q^2$ yielding $T^3$ and $Q^3$, respectively, or $T^1$ species grafting onto a $Q^2$ yielding $T^2$ and $Q^3$ and similar combinations involving D-Type dialkoxysiloxane moieties.

$DP_{Q\text{-}type}$, $DP_{T\text{-}type}$ and $DP_{D\text{-}Type}$ are the primary parameters that define the polymeric liquid material according to claim 1, together with the stoichiometric ratio of T-type/Q-type and the total molar content of D-type species in the material and can all be determined from quantitative $^{29}$Si NMR spectroscopy data with the special provisions given above for the calculation of $DP_{T\text{-}type}$ for bipodal silanes.

For materials containing more than one T-type subgroup with non-identical R' organofunctional substituents, the quantification of those two T-type chemical species within the material can be done either directly from quantitative analysis of $^{29}$Si NMR spectra, if the T-type moieties belonging to the two non-identical R' subgroups within the T-spectral window can be sufficiently resolved (FIG. 5). In more complicated cases where spectral separation is difficult or when both methoxy/ethoxy R groups are present in the material, which further complicates the quantitative analysis from $^{29}$Si NMR data because of the ethoxy/methoxy exchange described just below, non-identical R' bearing T-type subgroups can be analyzed independently by means of $^{1}$H or $^{13}$C NMR data without resolution restrictions sometimes encountered in $^{29}$Si NMR data.

The secondary parameters that define the polymeric liquid material can be measured using standard analytical tools: The content of hydroxy groups in the material can be determined using $^{29}$Si and/or $^{1}$H NMR spectroscopy and Karl Fischer titration. The molar ratio of ethoxy and methoxy terminal alkoxy units in the material are directly accessible from $^{13}$C NMR and independently from $^{29}$Si NMR data. The characterization of the reaction products in terms of viscosity is readily analyzed by means of standardized viscosity measurements such as a cylindrical rotation viscometer according to for example ASTM E2975-15: "Standard Test Method for Calibration of Concentric Cylinder Rotational Viscometers". Other viscosity test methods are also possible such as Staudinger-type capillary viscometers or modern, dynamic viscometry methods.

The amount of acetic anhydride added during the polycondensation reaction determines the size and average molecular weight of the polysiloxane MBBs. The morphology is importantly determined by the protocol (type and amount of Q, T and D-type precursors, mode of addition, core-only vs. core-shell). In a core-shell protocol, the stoichiometry of acetic anhydride to added T-type and D-type precursors further control the degree of grafting onto the core. Lower stoichiometric factors during shell-growth lead to relatively high amounts of unreacted monomer (T$^0$ species) in the reaction mixture which may not be desirable for practical applications, but which can be removed by distillation if necessary. For the preparation of core-shell type materials while using sterically bulky R'-group bearing T-type precursors, the addition of additional catalyst during shell-growth has proven advantageous.

In one preferred embodiment, the source of Q-type moieties is exclusively tetraethoxysilane (TEOS) or low molecular commercial oligomers thereof such as Dynasilan 40 (Evonik industries) or equivalent while organofunctional trimethoxysilanes or oligomers thereof are used as T-type precursors. Under the given reaction conditions by the method of manufacturing, it is surprisingly observed that alkoxy ligands on the various moieties exchange rather rapidly leading to a ligand exchanged structure (FIG. 6 and FIG. 7). This means that a cocondensate consisting of a tetraethoxysilane Q-type and a single R'-organofunctional trimethoxysilane then contains clearly distinguishable-ethoxy and -methoxy populations on the various T-type and Q-type moieties. For a T$^1$ moiety, which has two terminal alkoxy groups, this leads to three distinct subpopulations, namely

- a subpopulation with two —OMe groups (wherein no —OMe has been exchanged),
- a subpopulation with one —OMe and one —OEt group each (wherein one OMe has been exchanged)
- a subpopulation with two —OEt groups (wherein two —OMe have been exchanged).

For the middle one of those three T$^1$ subpopulations, this means that all four substituents on that silicon atom are different (1 Si—O—Si bond, 1 Si—C bond linking to the R' organofunctional group, 1 Si—OMe, 1 Si—OEt) and hence that it has chiral properties. The population of said chiral T$^1$ subgroup must amount to at least 3% of the total T$^1$ population which is also proportional to its molar content (see also NMR T$^1$ subspeciation shown in FIG. 4, example 9a, PTMS). The practical implication of this preferred embodiment is that ethoxysilane Q-type and methoxysilane T-type precursors are technically the most relevant and also the least costly raw materials. Hence this embodiment marks the most effective option in terms of total cost of raw materials for technical manufacturing.

In a second preferred embodiment, the T-type species feature at least two subpopulations bearing non-identical R' organofunctional groups (FIG. 8 and FIG. 9), where the minor constituent must make up at least 3% of the total T-type species in the material. This means that the resulting materials can be designed from bottom up to feature multifunctional properties.

In a further advantageous embodiment (claim 5) of a material containing at least two T-type subgroups with non-identical R'-organofunctional groups, the following restrictions apply:

Either
a) both T-type organofunctional siloxane identities are chosen to have at least two non-identical hydrophobic R' groups both belonging to group i) of the permittable selection of functionalities defined in claim 1 or
b) at least one T-type organofunctional siloxane is selected from the list of hydrophobic R' groups belonging to group i) and at least a second one being selected from the group of various organofunctional groups ii) R'=L-Z and/or from the groups of special functionality bearing groups iii) R' =R$_s$ of the permittable selection of functionalities given in claim 1.

This embodiment very specifically targets two types of application concepts, namely that of a tailorable i)/i) hydrophobic compound for restriction a). and a mixed hydrophobic functional-in short notation a i)/(ii) or iii)—compound for restriction b). When looking at the potential use of these polymeric liquid materials, they will often find applications in coatings, polymer systems, paints, dispersions or generally as interface active compounds. For many of these applications, formulations must be developed, where it is important to understand the interplay of the relevant interfaces and solvent systems.

According to restriction a)., a polymeric liquid material can be created by using multiple hydrophobic i) R'-organofunctional T-type moieties, which allows to control steric accessibility and hydrophobic properties of the material and thus its solubility and compatibility with polymers, solvents, inorganic and hybrid phases alike. This allow tailoring of the polymeric liquid material to virtually any application specific formulation with a degree of freedom not attainable by today's commercial silane monomer and prehydrolysate systems.

According to restriction b), the combination of R' moieties bearing both hydrophobic i) properties and specific functionality ii) or iii) then allows tailoring of the overall compatibility with an application specific matrix while also introducing further chemical connectivity options. For example, a material exhibiting both hydrophobic R' selected from class i) while simultaneously bearing radical polymerizable groups such as methacrylate groups (selected from ii)) could then control its interaction/compatibility through the hydrophobic component and its radical crosslinking reactivity totally independently through the loading of said methacrylate component. The division of application relevant system compatibility by selecting of a first type and loading of hydrophobic R' functionality and the selection of a second R' group to introduce a specific chemical function is expected to greatly improve performance and cost effectiveness of silane and siloxane technology. The advantage of this approach seems to further benefit from a core-shell type architecture, while different combinations are possible and could individually be selected depending on the application:

- a ii) or iii) functional R' loading within the core with a hydrophobic i) T-type siloxane forming a shell, thus combining system compatibility with the ability to incorporate specific function in the core. Preferable core R' functionality can serve to increase the adsorption/incorporation of guest species such as metal and transition metal ions or small molecule drugs etc. in order to control and preferably custom-tailor functionality. Particularly suited for this are organofunctional trialkoxysilane precursors bearing specific ligand groups (—$NH_2$, SH, —$PO_3H$) or covalently bonded positively or negatively charged species (—$SO_3$—, —$PO_3^2$, COO—, —$NR_3^+$). Ligand group bearing functionality is a preferable option for the preparation of core-shell materials.
- Hydrophobic i) and functional ii)/iii) R' moieties both present in a shell, creating an interplay between hydrophobic/matrix compatibility tailoring and functional group density and activity.
- Hydrophobic i) moieties distributed inside the core and functional ii)/iii) moieties in the shell. This case holds promise for biotechnology and drug delivery applications, particularly when water-soluble and R' functionalities with high affinity for biomolecules, specific bioreceptors (by subsequent chemical functionalization of the shell), are used in the shell and the hydrophobic core function is used to improve compatibility and solubility of small molecule drugs or other therapeutic or even theragnostic agents.

One of the main key advantages of the polymeric liquid materials according to this invention is the fact that they are essentially free of silanol species (Si—OH). Specifically, their molar content with respect to the total number of Si atoms present in the material is less than 5%, preferably less than 1.5% and most preferably less than 0.5% (claim 2). This provides greatly improved stability and shelf life over conventional sol-gel based hybrid materials and substantially more structural control. In practical applications, they can be used "as is" in non-polar organic solvents, blends etc. or directly incorporated into hydrophobic matrices such as polymer melts.

According to one aspect, the polymeric liquid material product is converted to nanoscale building blocks by hydrolysis in water directly or in a suitable water/solvent system in the presence of an acid or base catalyst if needed. The hydrolysis product according to this invention is a nanoscale building block (NBB) but with a perfectly controllable molecular substructure and custom tailorable function. Compared to the state of the art, such novel hydrolysis product NBBs have the advantage of improved composition control and more efficient use of the shell component (the function bearing tri- and dialkoxysilane) which are often the cost-limiting component in practical applications.

In a further advantageous embodiment of core-shell materials, multicomponent shell architectures are deposited by repeating the shell addition procedure multiple times with different organofunctional trialkoxysilane and optionally dialkoxysilane monomers. Each monomer is preferably added together with its selected equivalent amount of acetic anhydride needed to create the desired degree of condensation of the subshell in question.

In order to allow sufficiently fast kinetics to yield reasonable reaction times, the use of elevated temperature in conjunction with a catalyst are required for the non-hydrolytic acetic anhydride chemistry. The reaction temperature for steps b) through e) is in the range from 70° C. to 170° C., preferably in the range of 100° C. to 150° C. and most preferably in the range from 120° C. to 140° C. The pressure during steps b) through d) is in the range of 0.1 bar to 2 bar, preferably in the range of 0.5 bar to 1.4 bar and most preferably is between 0.9 bar and 1.2 bar.

Depending on the reaction temperature, some of the monomers and the acetic anhydride reagent are near their boiling points. Each reaction step (preparation of a core or of a core-only material, but also growth of a shell or subshell) taking typically between half an hour and several hours, depending on the catalyst type and concentration used, some of the reagents are prone to boiling over together with the acetic ester byproducts. This leads to gradual losses of selected reagents, depending on their boiling points and thus to lower or higher effective stoichiometric acetic anhydride factors and also DP values than anticipated form the theoretical stoichiometry used. These losses can be quantified as the difference between the molar amounts of acetic anhydride used (stoichiometric factors) and the effectively formed bonds (NMR analysis, quantification of acetic acid ester reaction products).

In an advantageous embodiment (claim 13), the loss of monomers and/or acetic anhydride reagents over the course of the reaction is counteracted by equipping the reactor with a distillation attachment containing a separation stage with a few theoretical plates connected to a distillation bridge, thus allowing quantitative separation of the low boiling acetic ester reaction byproducts from unused higher boiling volatile reagents, the former being then fed back straight into the reactor. This greatly improves both accuracy (effective DP values agree with selected amount of reagents used) and reproducibility (deviation of theoretical versus effective stoichiometry of acetic anhydride used depends on starting monomers and reaction temperature etc.) of the method of production.

As reported by Möller in his original patent application, catalysts used for the acetic anhydride non-hydrolytic method are advantageously selected from the family tetraalkoxytitanates $Ti(OR)_4$ or Zinc diethanolates $Zn(OR)_2$ where R=—$CH_2CH_3$, —$CH(CH_3)_2$, —$CH_2CH_2CH_3$, —$C(CH_3)_3$ or —$CH_2CH_2CH_2CH_3$. Another group of suitable catalysts are dibutyltin(IV) compounds which are often used in organic synthesis, particular for transesterification reactions and also as a (hydrolytic) polycondensation catalyst for alkoxysilanes. Amongst the most promising candidate catalysts from this family are dibutyltin(IV)-oxide, dibutyltin(IV)-dilaurate, dibutyltin(IV)-diacetate, dibutyltin (IV)-diacetylacetonate or dibutyltin(IV)-dioctanoate. More recent studies have identified Tetrakis(trimethylsiloxy)titanium $Ti(O—Si(CH_3)_3)_4$ as a particularly suitable catalyst. Catalyst concentrations are generally in the range from 0.02% mol to 1.5% mol based on the total molar silicon content in the prepared material. Typically, the catalyst is added in the core buildup step and dosing of additional catalyst during the shell growth step is optional but generally not necessary.

In summary, the present invention solves the task of providing a new class of liquid polysiloxane materials starting from cost-effective commodity precursors and achieving unprecedented degrees of freedom to tailor (multi)-functional properties. The materials are classified in terms of their chemical identity, that is, Q-type non-organofunctional, T-type monoorganofunctional and optionally contained D-type diorganofunctional moieties. The invention further solves the task of combining T-type organofunctional species within a polymeric MBB either in various preferred combinations defined by spatial, stereochemical and compositional factors. The corresponding method of production for said liquid polymeric polysiloxanes involves a scalable, non-hydrolytic acetic anhydride method either in a simple one-step format to create statistically distributed "core-only" hyPAS materials or as a two- or multistep process to create core-shell materials.

BRIEF DESCRIPTION OF THE DRAWINGS

The above mentioned and other features and objects of this invention and the manner of achieving them will become more apparent and this invention itself will be better understood by reference to the preceding description of various embodiments of this invention taken in conjunction with the accompanying drawings, wherein are shown.

DETAILED DESCRIPTION OF THE INVENTION

Figure 1:
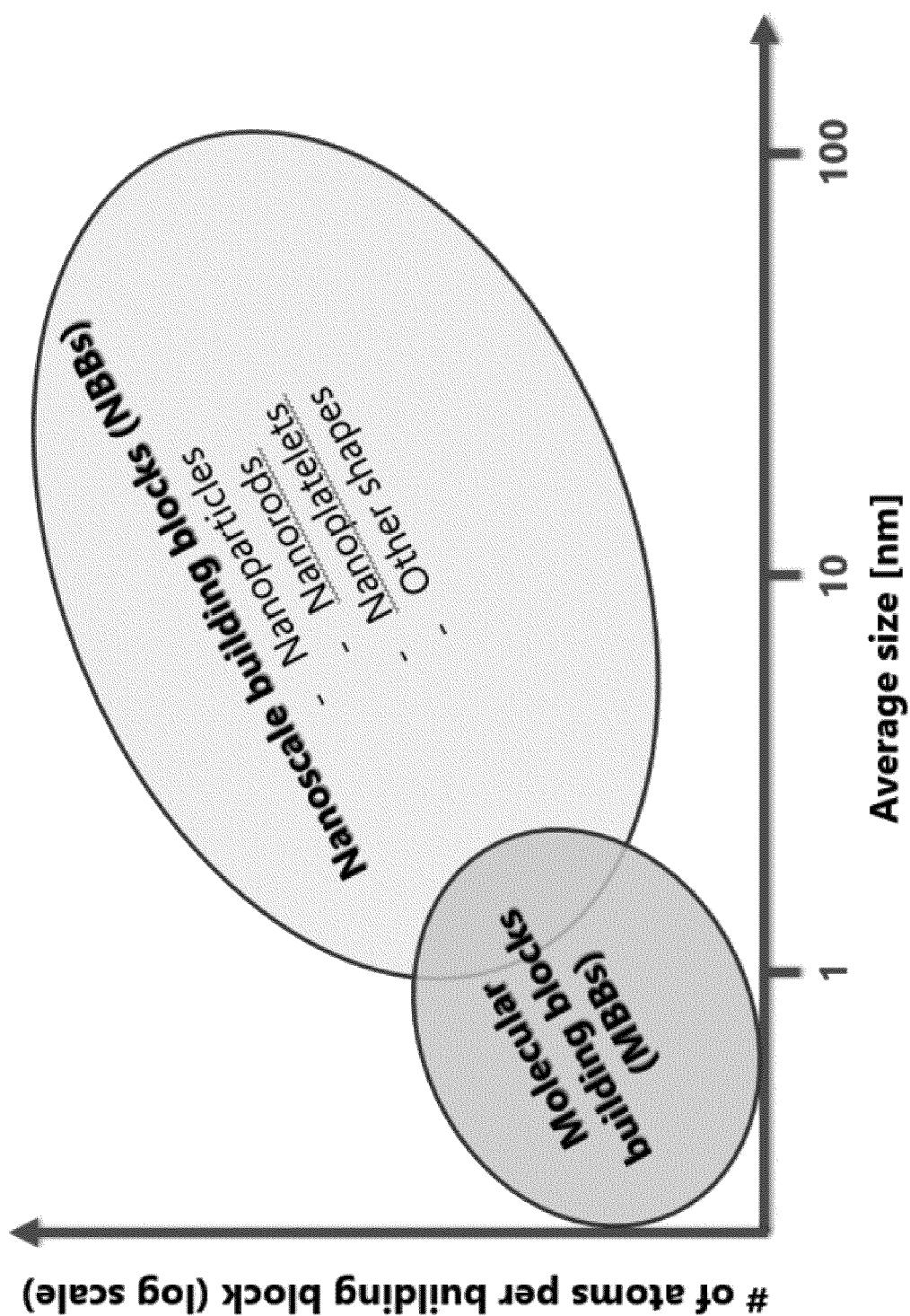
FIG. 1 a rough classification of molecular and nano science in terms of number of constituent atoms and effective size.
Figure 2:
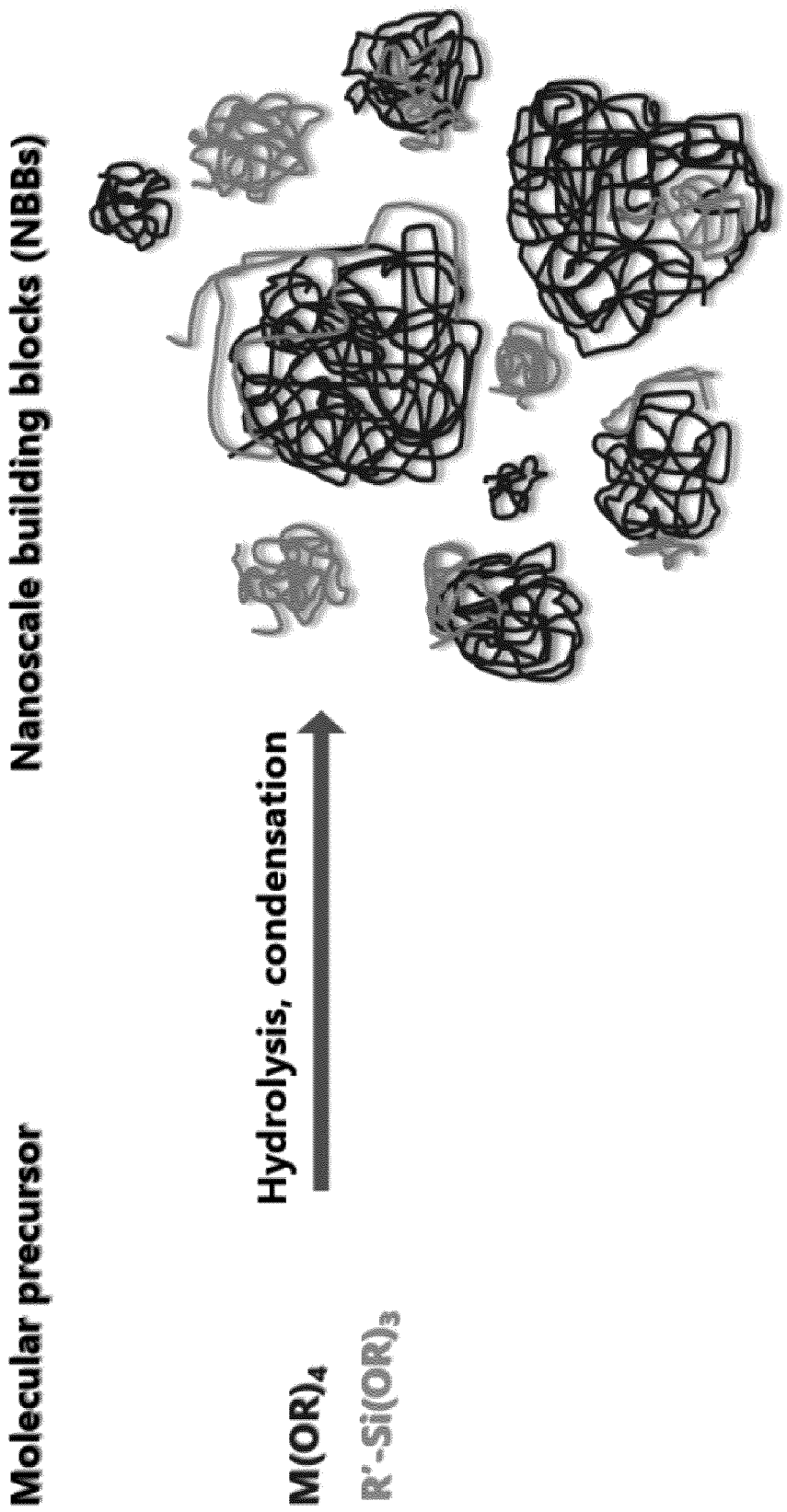
FIG. 2 limitation of classical hydrolytic sol-gel methods to prepare functional nanoscale building blocks (NBBs); the product distribution of NBBs is determined by stochastic events in solution and relative reaction rates of the different alkoxide and silane precursors and hence poorly controllable.
Figure 3:
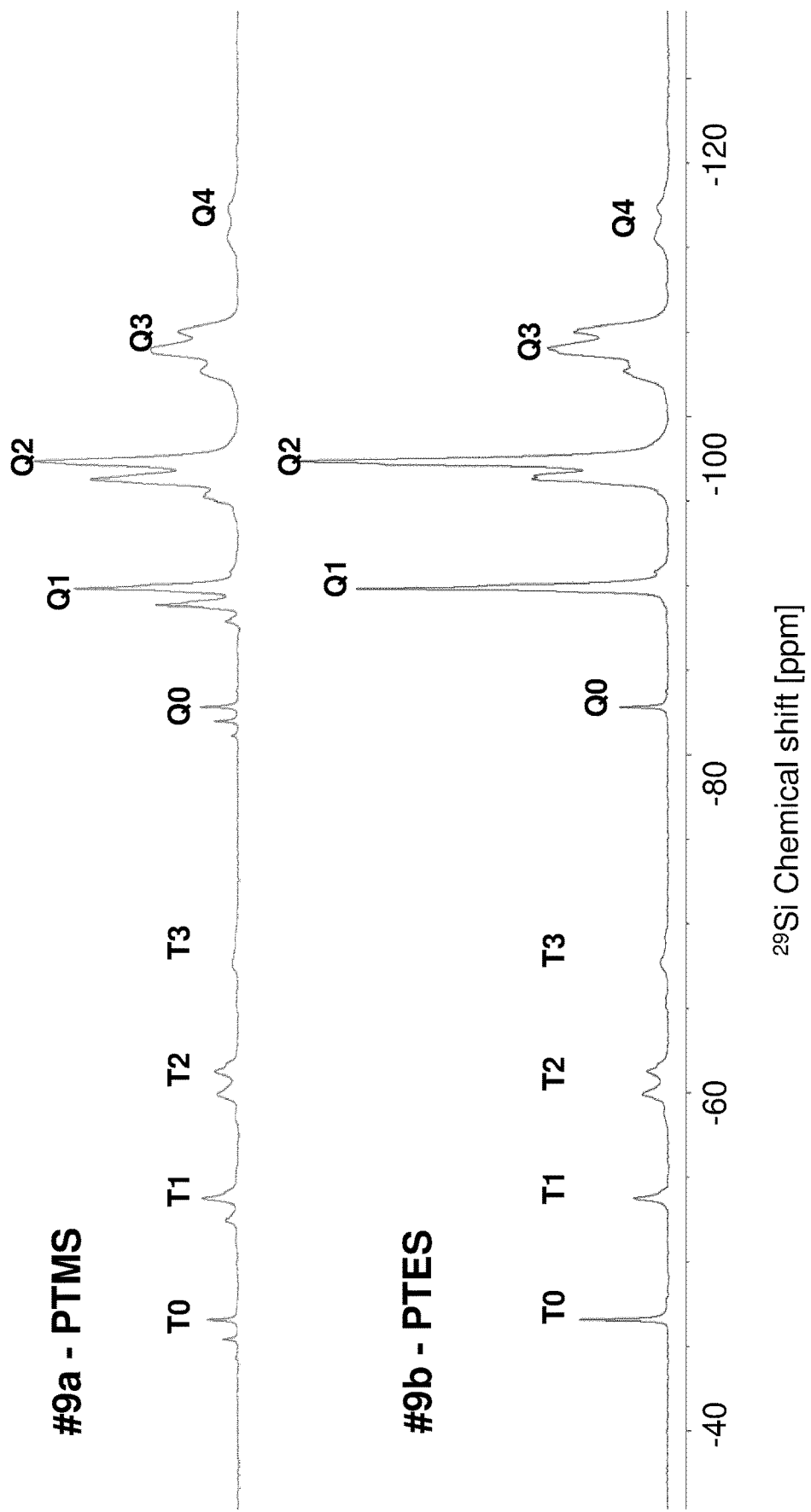
FIG. 3 $^{29}$Si NMR spectra of two samples prepared from D-40 (Q-type) and PTMS (Propyltrimethoxysilane), see upper (red) trace, or PTES (Propyltriethoxysilane), see lower (blue) trace.
Figure 4:
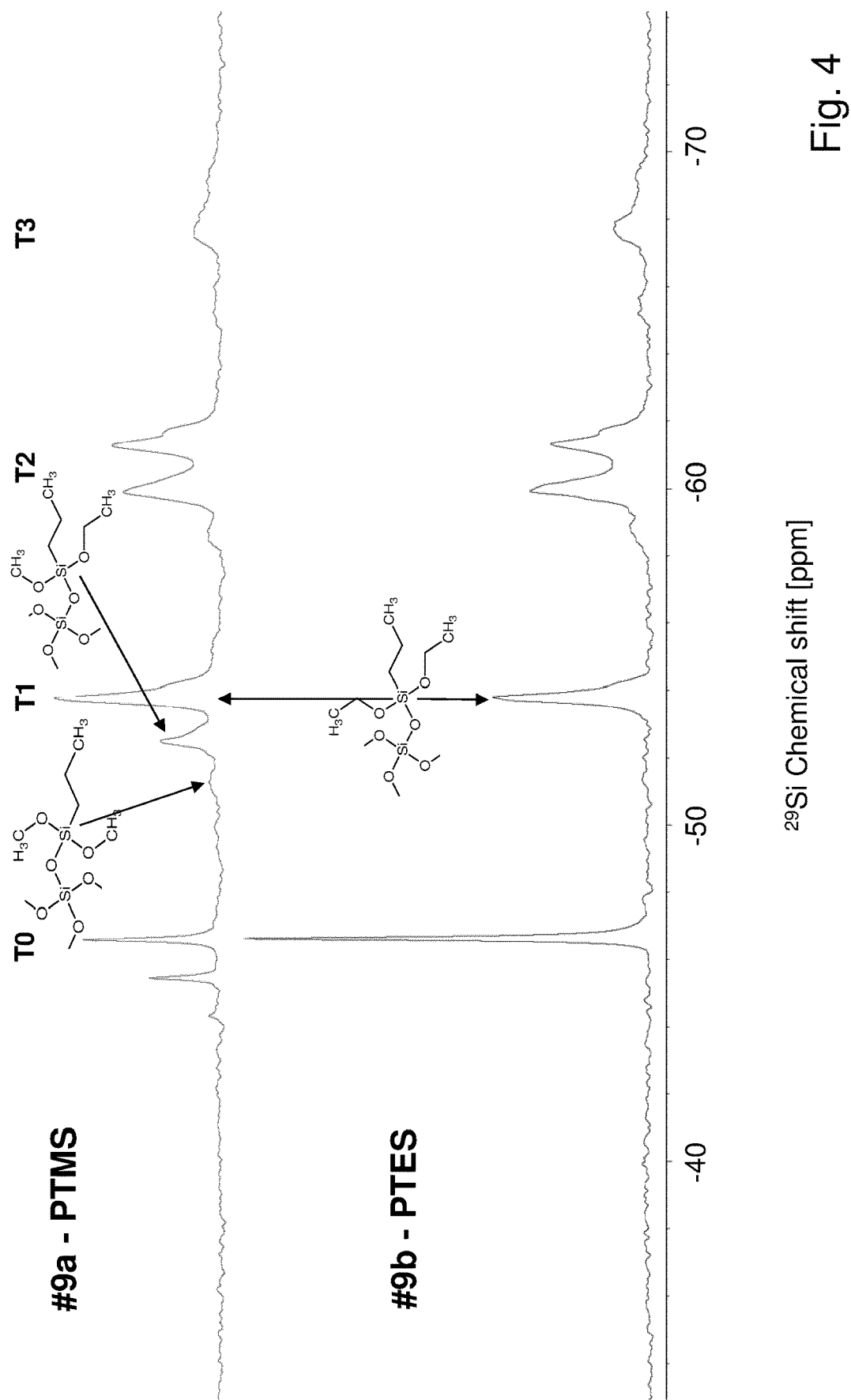
FIG. 4 $^{29}$Si NMR spectra of the two samples of FIG. 3 zoomed in on the T″ spectral region; spectral confirmation of Ethoxy-Methoxy exchange of T-type species FIG. 5 $^{29}$Si NMR spectrum of a polymeric liquid material prepared from D-40 (Q-type), MTES (Methyltriethoxysilane) and OTES (Octyltriethoxysilane)
Figure 5:
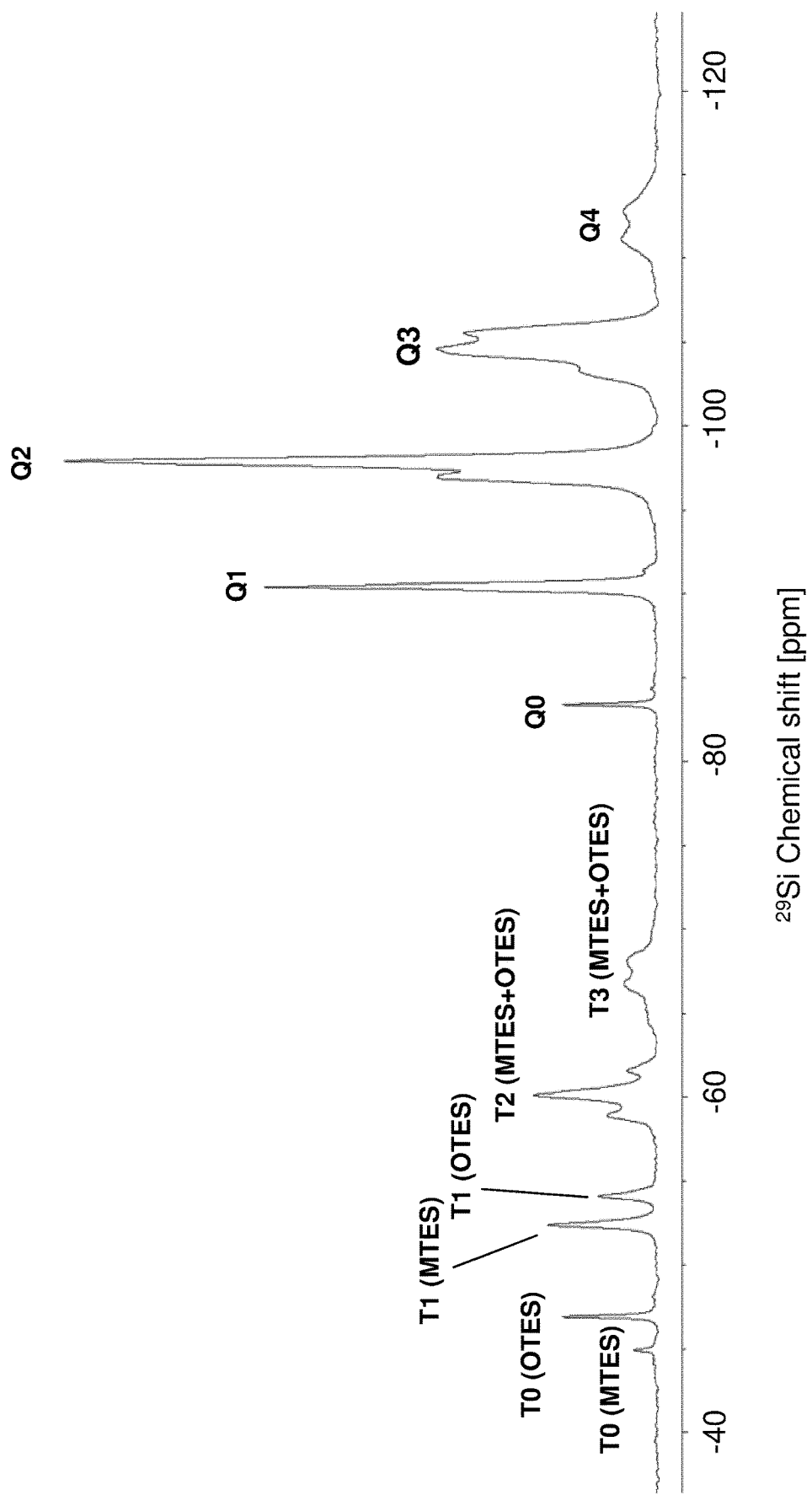
Figure 6:
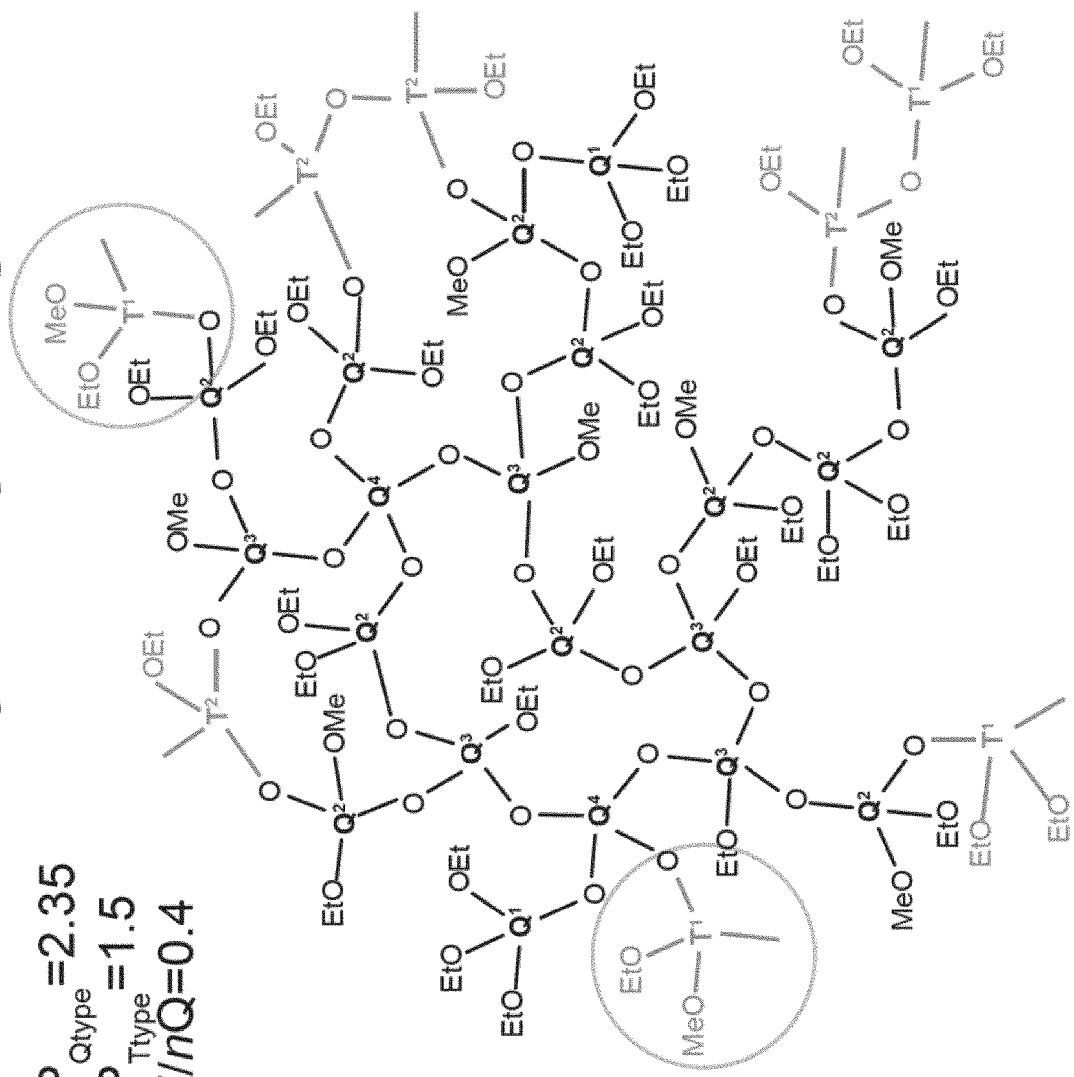
FIG. 6 a model sketch for a core-shell material obtained from TEOS (Q-type) and MTMS (T-type) precursors with an ethoxy-methoxy exchanged alkoxy chemistry.
Figure 7:
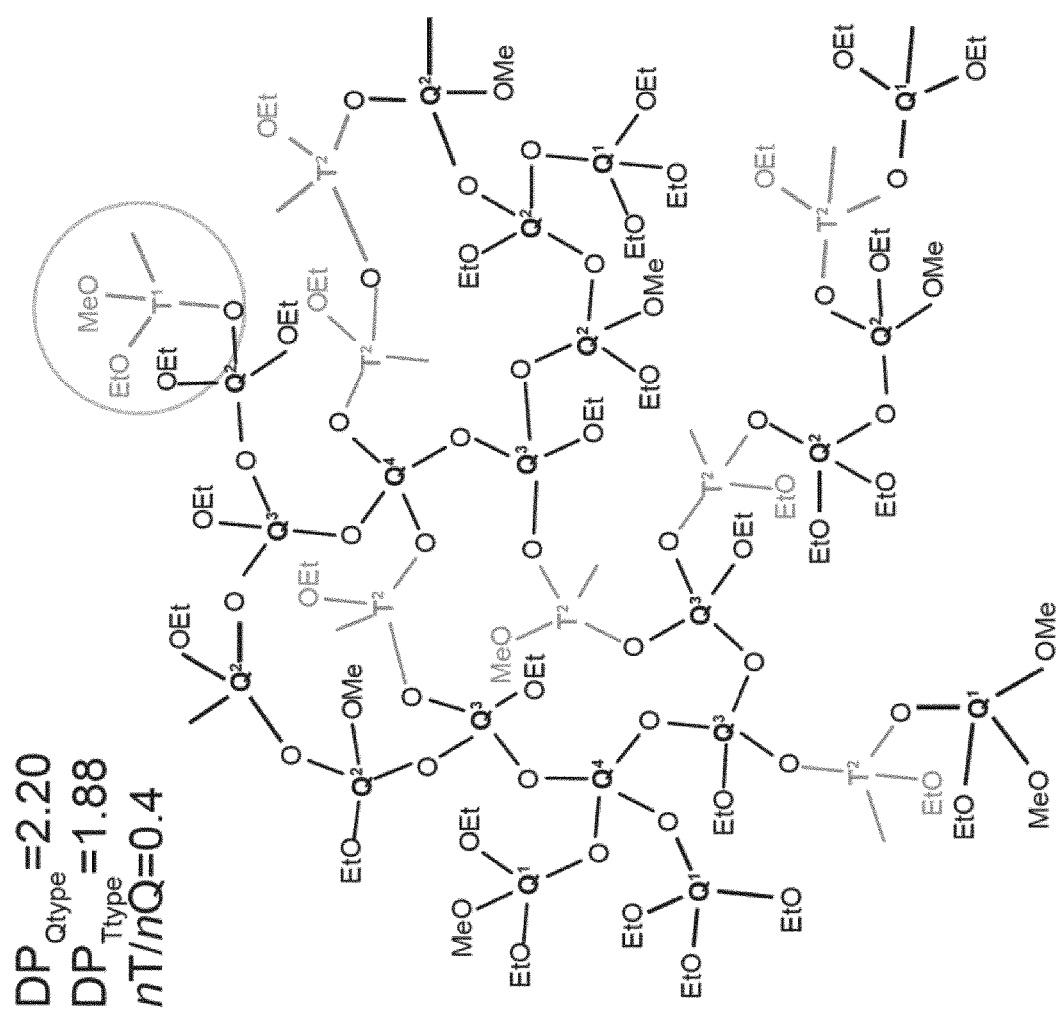
FIG. 7 a model sketch for a core-only material obtained from TEOS (Q-type) and MTMS (T-type) precursors with an ethoxy-methoxy exchanged alkoxy chemistry.
Figure 8:
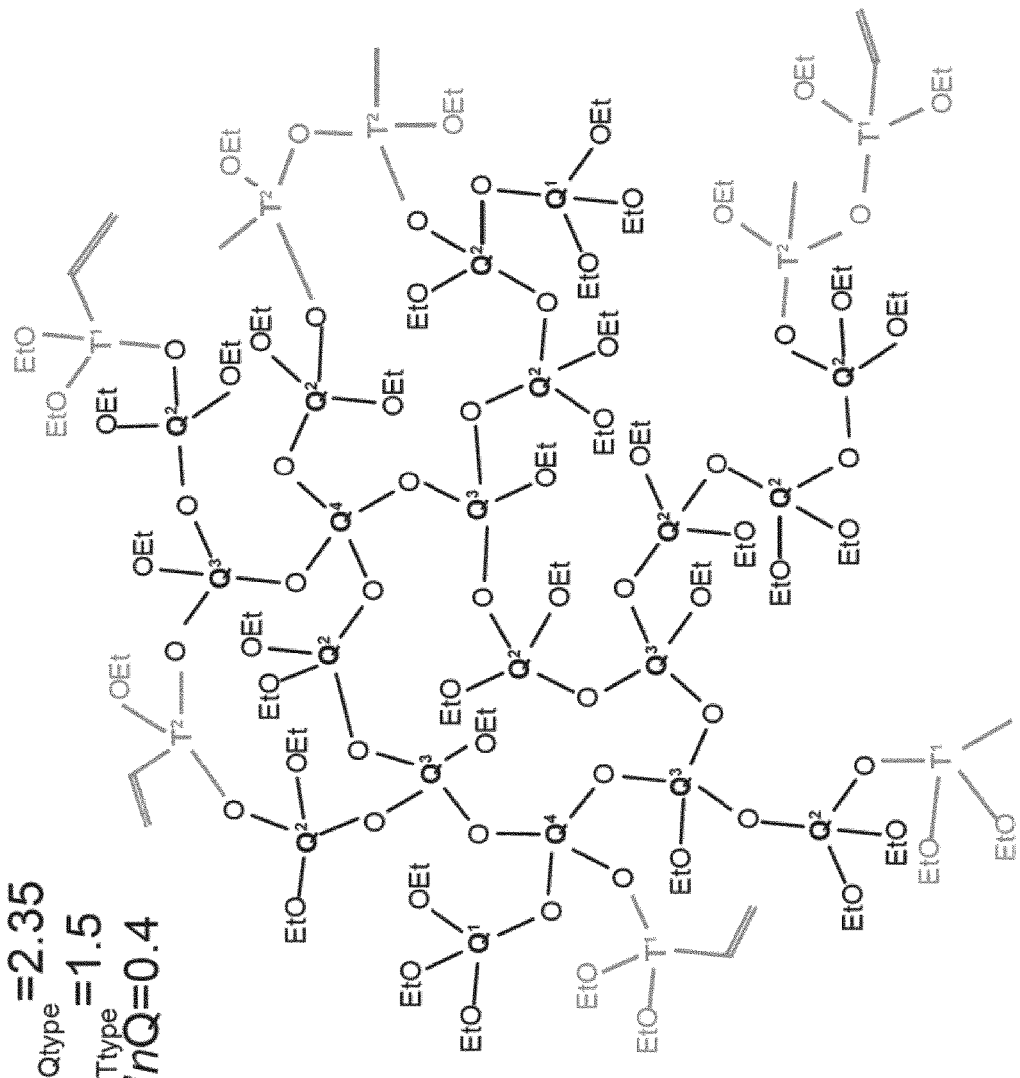
FIG. 8 a model sketch for a core-shell material obtained from TEOS (Q-type) and mixed mono-organofunctional triethoxysilanes MTES (T-type #1) and VTES (T-type #2)
Figure 9:
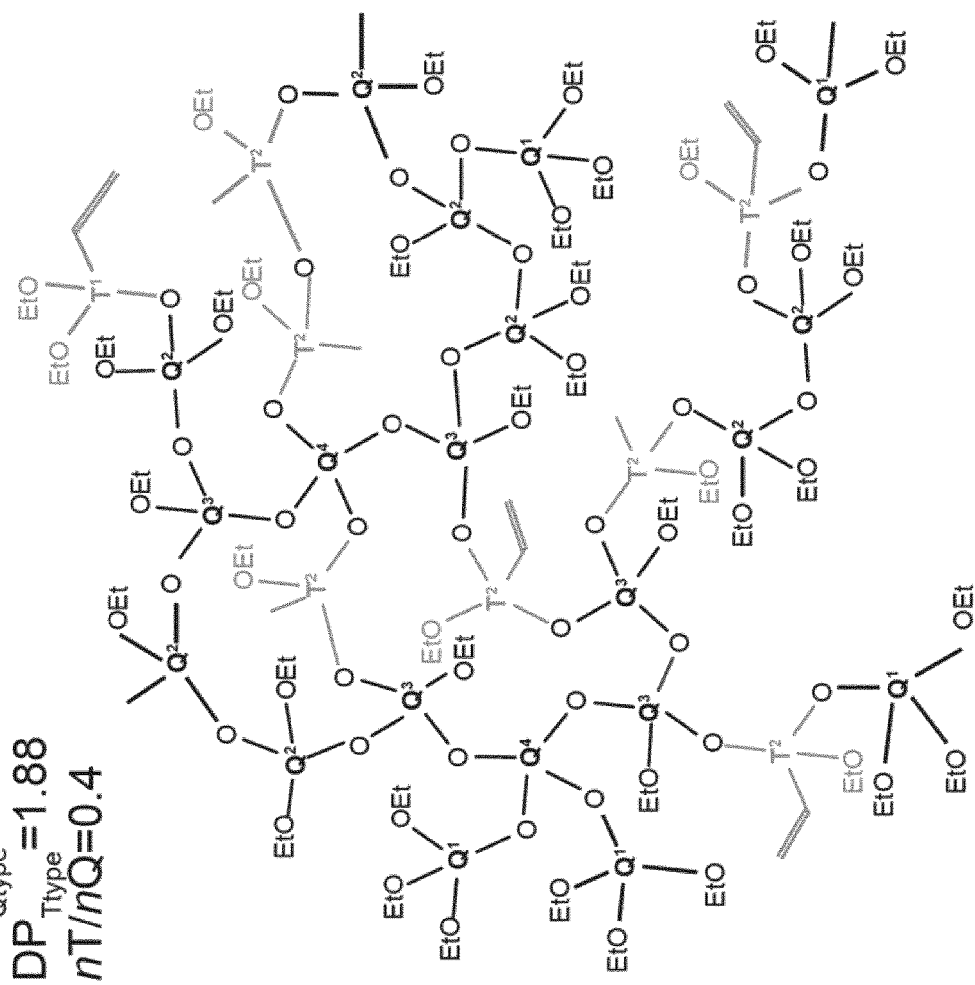
FIG. 9 a model sketch for a core-only material obtained from TEOS (Q-type) and mixed mono-organofunctional triethoxysilanes MTES (T-type #1) and VTES (T-type #2).

Example 1: Synthesis of TEOS/MTMS Material with $n_{Q\text{-}type}$: $n_{T\text{-}type}$=1:0.1

52.0 g/0.25 mol Si of a Q-type precursor tetraethoxysilane (TEOS) and 0.87 ml of tetrakis(trimethylsiloxy) titanium (0.5 mol % with respect to moles of Q-type Si) were placed inside a 100 ml round bottom flask with distillation bridge together with 3.4 g 25 mmol of a T-type precursor methyltrimethoxysilane (MTMS). The reaction flask was then purged with nitrogen, sealed, left under nitrogen pressure (balloon) and immersed into a hot oil bath which was kept at 140° C. The reaction mixture was brought to temperature with stirring at 500 rpm. Once the temperature has been reached, a selected amount (0.275 mol/28.0 g) acetic anhydride was added slowly. The onset of the reaction was evidenced during the addition by an accelerating refluxing rate of the reaction byproduct ethyl acetate which started to make its way up to the distillation bridge. After approximately 15 minutes, a continuous stream of ethyl acetate was distilling over through the distillation bridge and collected in the capture vessel. The reaction continued for a total time of about 55 more minutes, at which point it stopped, commensurate with the ceasing of the ethyl acetate distilling over. The collection vessel was removed after a total reaction time of 1 h and 15 minutes and emptied, yielding a total mass of 42.1 g of collected condensate.

Example 2: Synthesis of Ethylsilicate-40/VTMS Core-Shell Material with $n_{Q\text{-}type}$: $n_{T\text{-}type}$=1:0.30 i) Fabrication of a hyPAS core from Ethylsilicate-40 Q-type precursor An oligomeric TEOS (ethylsilicate) derived hyPAS Q-type core only was prepared using an experimental setup analogous to Example 1 in a 1 l round bottom flask and identical temperature and stirring rate. As a catalyst, 7.1 g/28 mmol of Ti(IV)-isopropoxide was used. Instead of TEOS, an oligomeric ethylsilicate 40 mixture (Dynasylan 40, Evonik Industries) was used as Q-type precursor. The amount of Ethylsilicate-40 and Ac$_2$O used in the synthesis were 364 g/2.5 mol Si and 40.8 g 0.4 mol, respectively. The total reaction time was 1 h 05 minutes and produced 66.5 g of condensate byproduct.

ii) Growth of a VTMS shell over a hyPAS core with g=1.33 The shell growth onto the core material prepared in step i) was done after its completion. To the reaction mixture from step i) still kept in the same vessel at 140° C. with stirring, an amount of T-type functional trialkoxysilane used for shell growth was added together with a stoichiometric amount of acetic anhydride for shell growth. Accordingly, 111 g/0.75 mol of vinyltrimethoxysilane (VTMS) and 102 g 1 mol of Ac$_2$O were dosed to the reaction mixture over the course of 15 minutes with a syringe pump. At the end of the reaction after 40 minutes, excess byproducts and low-molecular components were removed by pulling a vacuum of 600 mbar for 5 minutes. The round bottom flask was then removed from the oil bath and allowed to cool to room temperature. The shell growth step yielded 162.6 g of collected condensate.

Example 2b: Synthesis of Ethylsilicate-40/VTMS Core-Shell Material with $n_{Q\text{-}type}$: $n_{T\text{-}type}$=1:0.30 with a Lower Stoichiometric Amount of Acetic Anhydride Added During Shell Growth (g=0.66)

The exact same synthesis procedure as in Example 2 above was used to prepare the material, with the sole difference that during the VTMS shell growth step ii), only 51 g (0.5 mol) of acetic anhydride Ac$_2$O was added. This resulted in a lower degree of polymerization of the core and shell in the final material.

Example 2c: Synthesis of Ethylsilicate-40/VTMS Core-Shell Material with $n_{Q\text{-}type}$: $n_{T\text{-}type}$=1:0.30 with No Addition of Acetic Anhydride During the Shell Growth Step (g=0)

Again, the exact same synthesis procedure as in Example 2 above was used to prepare the material, with the sole difference that during the VTMS shell growth step ii), no acetic anhydride Ac$_2$O was added. This resulted in an even lower degree of polymerization of the core and shell in the final material and a higher content of unreacted Q and T-type monomers (Q°, T°) compared to Example 2 and 2b, respectively.

Example 2d: Synthesis of Ethylsilicate-40/VTMS Core-Shell Material with $n_{Q\text{-}type}$: $n_{T\text{-}type}$=1:0.30 with No Addition of Acetic Anhydride During the Core Growth Step The exact same synthesis procedure as in Example 2 above was used to prepare the material, with the sole difference that during the core formation step i), no acetic anhydride Ac$_2$O was added, while the amount of acetic anhydride added in the shell growth step ii) was left unchanged. During core formation, the ethylsilicate/catalyst mixture was stirred at temperature for 45 minutes without any distillate boiling over. The shell growth step was then carried out as described in Example 2. This protocol resulted in a lower degree of polymerization of the core and shell in the final material and a higher content of unreacted Q and T-type monomers (Q°, T°) compared to Example 2.

Example 2e: Synthesis of Ethylsilicate-40/VTMS Core-Shell Material with $n_{Q\text{-}type}$: $n_{T\text{-}type}$=1:0.05 with Zero Addition of Acetic Anhydride During Both Core and Shell Preparation Steps The synthesis was carried out analogous to the procedure described in Example 2, however, the amount of VTMS during shell growth was 18.5 g/0.125 mol, leading to $n_{Q\text{-}type}n_{T\text{-}type}$=1:0.05. During core preparation step i), the catalyst/ethylsilicate-40 mixture was stirred without addition of acetic anhydride for 45 minutes at temperature. During the shell grafting step ii), VTMS was dosed within 15 minutes but again without addition of acetic anhydride.

Example 3: Synthesis of a (Q$_{type}$+D$_{type}$) Core: T$_{type}$ Shell Material with $n_{Q\text{-}type}$: $n_{T\text{-}type}$=1 0.136 and $n_{D\text{-}type}$: $n_{si,tot}$=8.1%

The material was synthesized using the exact same procedure as described in example 2 but on a 10 times smaller scale, with the difference that during the core formation step i), in addition to the given amount of Ethylsilicate 40 (36.4 g/250 mmol), an amount of 25 mmol/3.6 g of dimethyldiethoxysilane (DMDES) was present in the original starting mixture and the amount of acetic acid used in the core growth step was 4.5 g/44 mmol. The entire reaction was carried out with a refluxing/distillation setup unit containing a 10 cm long Vigreux column in addition to the distillation bridge in order to prevent loss by boiling over of the more volatile DMDES (Bp=115° C.) component.

The shell growth step was carried out in exactly the same way as in example 2, with the difference that a different stoichiometric loading of the T-type shell precursor VTMS was used (5.0 g/34 mmol) and the amount of acetic anhydride in the shell growth step was (5.1 g/50 mmol). An acetic anhydride stoichiometric factor g=1.5 was used in the shell growth step. The total amount of recovered condensate was 14.3 g.

Examples 5, 7, 8, 12, 15: Synthesis of Core-Only Materials with a Range of Chemistries and Compositions Additional experiments were performed with various other Q-type/T-type combinations and stoichiometries using the "core-only" protocol described in Example 1. The chemical synthesis parameters for these materials are summarized in Table 1.

Examples 4, 6, 9, 10, 11, 13, 14: Synthesis of Core-Shell Materials with a Range of Chemistries and Compositions Additional experiments were performed with various other Q-type/T-type combinations and stoichiometries using the core-shell protocol described in Example 2. The chemical synthesis parameters for these materials are summarized in Table 1.

Example 15: Synthesis of a "Core-Only" Ethylsilicate Oligomer/MTMS MBB with $n_{Q\text{-}type}$: $n_{T\text{-}type}$=1: 0.1 Using an Alternative Catalyst System The material was synthesized in exactly the same way as the material in example 1, with the only difference, that the catalyst system consisted of a mixture of tetraisopropoxytitanium(IV) and dibutyltin(IV)-dilaurate.

Example 16: Hydrolysis of a Polymeric Liquid Material 6.4 g (9.5 ml) of Ethanol and 5.1 g of a crude reaction product from Example 3 were mixed and heated to 40° C. in an Erlenmeyer flask with stirring. Once the temperature had equilibrated, 1.1 ml of a 0.02M HNO$_3$ solution was added followed by 0.4 ml of distilled water. After a brief homogenization period, the beaker was sealed off with parafilm and kept for 12 hours in a convective oven at 40° C. The final hydrolysis product was then filtered and stored in the refrigerator.

Example 17: Preparation of a Water in Oil Emulsion 12.5 g of a sample of a material sample of Example 7 was mixed with 5.0 ml of distilled water. The two-phase system was then vigorously shaken in a closed flask and further homogenized mechanically using an Ultra-Turrax homogenizer. The resulting emulsion was a creamy paste, which had a shelf life of several weeks when kept in a tightly sealed container.

TABLE 1

| | | | | | | | | | | | | | |
|---|---|---|---|---|---|---|---|---|---|---|---|---|---|
| | | | | Synthesis conditions. | | | | | | | | | |
| # | n T/n Q | T (° C.) | Catalyst | [Catalyst] (mol) | Q$_{type}$ | [Q$_{type}$] (mol Si) | T$_{type1}$ | [T$_{type1}$] (mol Si) | T$_{type2}$ | [T$_{type2}$] (mol Si) | D$_{type}$ | [D$_{type}$] (mol Si) |
| 1 | 0.10 | 140 | Ti(OTMS)$_4$ | 0.002 | TEOS | 0.250 | MTMS | 0.025 | | | | |
| 2 | 0.30 | 140 | Ti(OPr)$_4$ | 0.028 | D-40 | 2.500 | VTMS | 0.749 | | | | |
| 3 | 0.14 | 140 | Ti(OTMS)$_4$ | 0.002 | D-40 | 0.250 | VTMS | 0.034 | | | DMDES | 0.025 |
| 4 | 0.14 | 125 | Ti(OPr)$_4$ | 0.004 | D-40 | 0.746 | PTMS | 0.104 | OTES | 0.104 | | |

TABLE 1-continued

Synthesis conditions.

| # | n T/n Q | T (° C.) | Catalyst | [Catalyst] (mol) | $Q_{type}$ | $[Q_{type}]$ (mol Si) | $T_{type1}$ | $[T_{type1}]$ (mol Si) | $T_{type2}$ | $[T_{type2}]$ (mol Si) | $D_{type}$ | $[D_{type}]$ (mol Si) |
|---|---|---|---|---|---|---|---|---|---|---|---|---|
| 5 | 0.13 | 140 | Ti(OPr)$_4$ | 0.001 | TEOS | 0.303 | MTES | 0.040 | OTES | 0.040 | | |
| 6 | 0.14 | 140 | Ti(OPr)$_4$ | 0.011 | D-40 | 1.514 | PTES | 0.209 | TESPT | 0.417 | | |
| 7 | 0.03 | 140 | Ti(OPr)$_4$ | 0.001 | D-40 | 0.303 | FPTMS | 0.008 | | | | |
| 8 | 0.29 | 140 | Ti(OPr)$_4$ | 0.006 | TEOS | 1.193 | PTES | 0.340 | 3-TESPM | 0.068 | | |
| 9a | 0.14 | 140 | Ti(OPr)$_4$ | 0.002 | D-40 | 0.303 | PTMS | 0.042 | | | | |
| 9b | 0.14 | 140 | Ti(OPr)$_4$ | 0.002 | D-40 | 0.303 | PTES | 0.042 | | | | |
| 10 | 0.20 | 140 | Ti(OPr)$_4$ | 0.001 | TEOS | 0.250 | OTES | 0.050 | DEPETES | 0.025 | | |
| 11 | 0.13 | 140 | Ti(OPr)$_4$ | 0.001 | D-40 | 0.303 | MTES | 0.040 | NXT-100 | 0.020 | | |
| 12 | 0.20 | 140 | Ti(OPr)$_4$ | 0.001 | TEOS | 0.250 | MTES | 0.050 | GTMS | 0.010 | | |
| 13 | 0.08 | 140 | Ti(OPr)$_4$ | 0.001 | mixed | 0.400 | CPTES | 0.030 | APTES | 0.030 | | |
| 14 | 0.03 | 140 | Ti(OPr)$_4$ | 0.001 | D-40 | 0.303 | 4HPFOTES | 0.010 | | | | |
| 15 | 0.03 | 140 | Ti(OPr)$_4$ | 0.001 | D-40 | 0.303 | DDTES | 0.010 | PyTES | 0.015 | | |

TEOS: tetraethoxysilane,
VTMS: vinyltrimethoxysilane,
MTMS: methyltrimethoxysilane,
D-40: Dynasylane 40,
PTMS: propyltrimethoxysilane,
PTES: propyltriethoxysilane,
OTES: octyltriethoxysilane,
FPTMS: (3,3,3-trifluoropropyl)trimethoxysilane,
TESPT: Deolink TESPT-100,
3-TESPM: 3-(trimethoxysilyl)propyl methacrylate,
DEPETES: diethyl[2-(triethoxysilyl)ethyl]phosphonate,
GTMS: (3-glycidyloxypropyl)trimethoxysilane,
APTES: aminopropyltriethoxysilane,
4HPFOTES: 1H,1H,2H,2H-perfluorooctyltriethoxysilane,
CPTES: 3-chloropropyltriethoxysilane,
DDTES: dodecyltriethoxysilane,
PyTES: 4-[2-(Triethoxysilyl)ethyl]pyridine Table 2 below shows a selection of $^{29}$Si-NMR results from samples made from Examples 1 through 9 including quantitative speciation of Q-type and T-type moieties.

TABLE 2

$^{29}$Si NMR results.

| # | D0 % | D$^1$ % | D$^2$ % | T$^0$ % | T$^1$ % | T$^2$ % | T$^3$ % | Q$^0$ % | Q$^1$ % | Q$^2$ % | Q$^3$ % | Q$^4$ % | DP$_{Dtype}$ | DP$_{Ttype}$ | DP$_{Qtype}$ | n T/n Si$_{tot}$ |
|---|---|---|---|---|---|---|---|---|---|---|---|---|---|---|---|---|
| 1 | | | | 0.17 | 1.8 | 4.2 | 2.04 | 1.5 | 12.2 | 38.1 | 32.5 | 7.35 | | 1.99 | 2.35 | 0.08 |
| 2 | | | | 1.55 | 8.63 | 10.1 | 3.92 | 2.44 | 15.6 | 28.6 | 24.4 | 4.82 | | 1.68 | 2.18 | 0.24 |
| 3 | 1.7 | 2.99 | 3.34 | 0.79 | 3.06 | 4.56 | 2.02 | 1.85 | 16.5 | 36.1 | 22.3 | 4.79 | 1.20 | 1.75 | 2.14 | 0.10 |
| 4 | | | | 6.17 | 1.71 | 5.98 | 4.93 | 0.42 | 10.1 | 33.5 | 30.8 | 6.4 | | 1.51 | 2.40 | 0.19 |
| 5 | | | | 1.8 | 4.72 | 9.06 | 5.23 | 1.27 | 10.7 | 33.1 | 27.8 | 6.31 | | 1.85 | 2.34 | 0.21 |
| 6 | | | | 13.2 | 5.96 | 8.1 | 2.29 | 0.56 | 13.4 | 31.1 | 21.5 | 3.84 | | 1.62 | 2.21 | 0.30 |
| 7 | | | | 0.26 | 1.13 | 1.52 | 0.21 | 3.66 | 23 | 41.7 | 22.4 | 6.17 | | 1.54 | 2.05 | 0.03 |
| 8 | | | | 1.88 | 7.62 | 10.6 | 3.96 | 2.57 | 15.5 | 29.7 | 23.6 | 4.58 | | 1.69 | 2.16 | 0.24 |
| 9a | | | | 1.46 | 4.26 | 5.03 | 1.55 | 1.81 | 16.1 | 38.8 | 26.4 | 4.53 | | 1.54 | 2.18 | 0.12 |
| 9b | | | | 1.98 | 1.87 | 4.47 | 1.47 | 1.29 | 15.8 | 39.5 | 29.7 | 3.91 | | 1.55 | 2.21 | 0.10 |

The invention claimed is:

1. A polymeric liquid hyperbranched polysiloxane material composed of:

non-organofunctional Q-type alkoxysilicate moieties $Q^1$

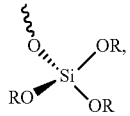

$Q^2$

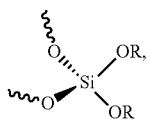

$Q^3$

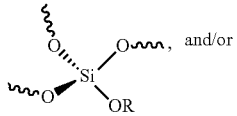

and/or

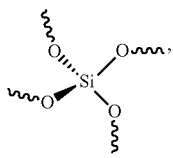

and

R' substituted mono-organofunctional T-type alkoxy terminated siloxane moieties

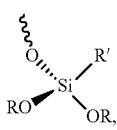   $T^1$

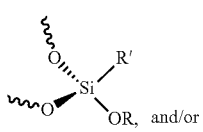   $T^2$

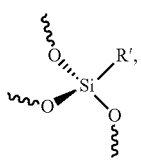   $T^3$ wherein:
  each R is independently methyl or ethyl, and
  each R' is either
  (i) selected from the group consisting of methyl, ethyl, n-propyl, isopropyl, n-butyl, t-butyl, hexyl, octyl, dodecyl, hexadecyl, (3,3,3-trifluoro) propyl, (1H,1H, 2H, 2H-perfluoro) octyl, (1H,1H, 2H, 2H-perfluoro) dodecyl, and (1H,1H, 2H, 2H-perfluoro) hexadecyl, or
  (ii) wherein
    L is an aliphatic linker selected from the group consisting of —CH$_2$—, —CH$_2$CH$_2$—, —CH$_2$CH$_2$CH$_2$—, —C$_6$H$_4$—, —C$_6$H$_4$—CH$_2$—, and —CH$_2$—CH$_2$—C$_6$H$_4$—CH$_2$—, and
    Z is a functional terminus selected from the group

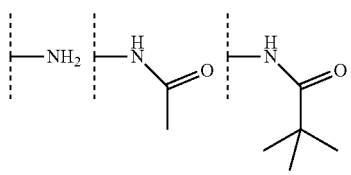

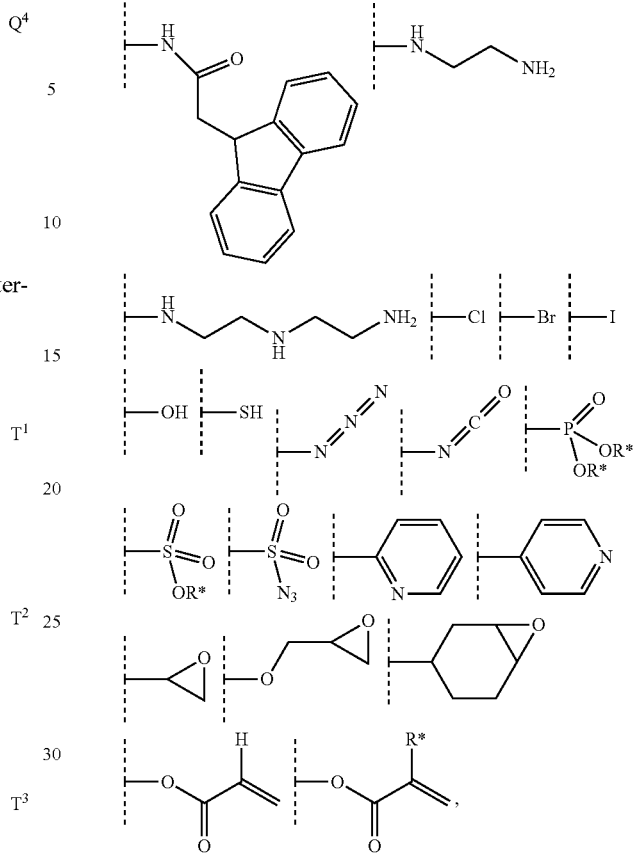

wherein R* is selected from the group consisting of —CH$_3$(Me), —CH$_2$CH$_3$(Et), and —CH$_2$CH$_2$CH$_2$CH$_3$ (Bu), or (iii) $R_S$ wherein:

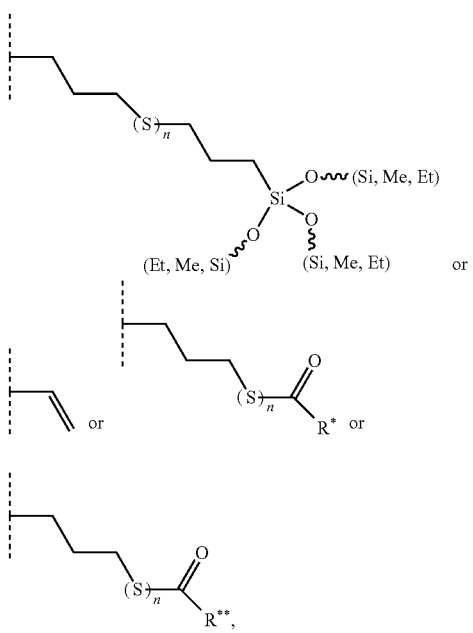

wherein:
n is 1, 2, 3, 4, or 5,
R* is selected from the group consisting of —CH$_3$ (Me), —CH$_2$CH$_3$(Et), and —CH$_2$CH$_2$CH$_2$CH$_3$ (Bu) as defined above, and
R** is selected from the group consisting of —(CH$_2$)$_5$CH$_3$ (Hexyl), —(CH$_2$)$_6$CH$_3$ (Heptyl), —(CH$_2$)$_7$CH$_3$ (Octyl), —(CH$_2$)$_8$CH$_3$ (Nonyl), —(CH$_2$)$_9$CH$_3$ (Decyl), —(CH$_2$)$_{11}$CH$_3$ (Dodecyl), and —(CH$_2$)$_{13}$CH$_3$ (Tetradecyl),
the material having a degree of polymerization of the non-organofunctional Q-type moieties (DP$_{Q\text{-}type}$) in the range of 1.3 to 2.7, and
the mono-organofunctional T-type moieties having a degree of polymerization of the mono-organofunctional T-type moieties (DP$_{T\text{-}type}$) in the range of 1.1 to 2.7,
the material optionally further containing R1-,R2-substituted di-organofunctional D-type siloxane moieties

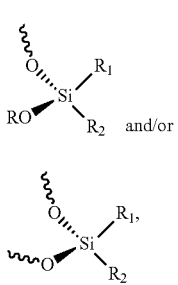

wherein:
R$_1$ and R$_2$ are independently selected from the group consisting of —CH$_3$, —C$_2$H$_5$, —C$_6$H$_5$, —C$_6$H$_{11}$, —CH=CH$_2$, —CH$_2$—CH$_2$—Cl, and —C$_5$H$_5$, and
the di-organofunctional D-type moieties having a degree of polymerization of the di-organofunctional D-type moieties DP$_{D\text{-}type}$ in the range of 1.0 to 1.9, and
the total content of di-organofunctional D-type siloxane moieties in the material does not exceed 10 molar percent,
the material having a viscosity in the range of 10-100'000 cP,
the material containing less than 5 molar percent hydroxy moieties (Si—OH) and the total silicon to free hydrolysable alkoxy molar ratio in the material being in the range of 1:1.25 to 1:2.75,
wherein the total molar content of ethoxy terminating units (—OCH$_2$—CH$_3$) is at least twice the total content of methoxy terminating units (—OCH$_3$), and
wherein the relative atomic ratio of T to Q species in the material is in the range 0.01:1 to 1:1,
with the following conditions:
the material comprises at least two non-identically R'-substituted mono-organofunctional (T-type) alkoxy terminated siloxane moiety populations, each population making up at least 3 molar percent of all mono-organofunctional T-type alkoxy terminated moieties in the material, and/or the material comprises chiral mono-organofunctional T$^1$-type alkoxy terminated moieties in an amount of at least 3 molar percent relative to all mono-organofunctional T-type alkoxy terminated moieties in the material.

2. The polymeric liquid material according to claim 1, wherein the material contains less than 0.5 molar percent hydroxy moieties (Si—OH).

3. The polymeric liquid material according to claim 1, wherein the degree of polymerization of the non-organofunctional Q-type moieties DP$_{Q\text{-}type}$ is in the range of 1.5 to 2.5, and/or
the degree of polymerization of the mono-organofunctional T-type moieties DP$_{T\text{-}type}$ is in the range of 1.3 to 2.2.

4. The polymeric liquid material according to claim 1, wherein the mono-organofunctional T-type moieties comprise
a first population of mono-organofunctional T-type alkoxy terminated siloxane moieties, wherein R' is selected from the group consisting of methyl, ethyl, n-propyl, isopropyl, n-butyl, t-butyl, hexyl, octyl, dodecyl, hexadecyl, (3,3,3-trifluoro) propyl, (1H,1H, 2H, 2H-perfluoro) octyl, (1H,1H, 2H, 2H-perfluoro) dodecyl, and (1H,1H, 2H, 2H-perfluoro) hexadecyl, and
either a second population of mono-organofunctional T-type alkoxy terminated siloxane moieties that is non-identical to the first type, wherein R' is selected from the group consisting of methyl, ethyl, n-propyl, isopropyl, n-butyl, t-butyl, hexyl, octyl, dodecyl, hexadecyl, (3,3,3-trifluoro) propyl, (1H,1H, 2H, 2H-perfluoro) octyl, (1H,1H, 2H, 2H-perfluoro) dodecyl, and (1H,1H, 2H, 2H-perfluoro) hexadecyl, or a third population of mono-organofunctional T-type alkoxy terminated siloxane moieties, wherein R' is L-Z or Rs.

5. The polymeric liquid material according to claim 1, wherein the relative atomic ratio of T to Q species is in the range 0.02:1 to 0.75:1 and preferably 0.03:1 to 0.5:1.

6. A hydrolysis product obtainable by reacting a polymeric liquid material according to claim 1 with a predetermined amount of water or with a predetermined amount of a water-solvent mixture.

7. An emulsion obtainable by emulsifying a polymeric liquid material according to claim 1 with a predetermined amount of water, optionally in the presence of at least one surfactant.

8. A method for preparing a polymeric liquid material according to claim 1, comprising the following steps:
a) charging an amount of tetraethoxysilane as Q-type precursor, and
   a1) optionally, adding at least one mono-organofunctional trialkoxysilane R'—Si(OR)$_3$ and
   a2) optionally, adding at least one di-organofunctional dialkoxysilane R$^1$—Si(OR)$_2$-R$_2$,
   in monomeric or in oligomeric form, into a reaction vessel together with a first stoichiometric amount of acetic anhydride in the presence of a catalyst;
b) heating up the reaction mixture provided in step a) in a water-free, inert atmosphere under stirring to reach a desired reaction temperature and distilling off any resulting acetic acid ester reaction side product until the reaction and the flow of distillate cease, thereby forming a polysiloxane core material,
c) optionally carrying out the steps of
   c1) adding at least one further mono-organofunctional trialkoxysilane R'—Si(OR)$_3$ and c2) optionally, adding at least one further di-organo-functional dialkoxysilane R$_1$—Si(OR)$_2$—R$_2$, in monomeric or in oligomeric form, together with a second stoichiometric amount of acetic anhydride, optionally with additional catalyst, to the hot reaction mixture formed in step b) with continuing stirring, distilling over any further acetic acid ester formed, and continuing the reaction until any distillate flow ceases again, thereby forming a functional shell layer grafted onto the core species previously prepared in step a);

d) optionally building at least one further functional shell layer by repeating the addition and reaction protocol described in step c) at least once;

e) optionally removing low-molecular reaction products and/or residual starting materials in the reaction mixture by vacuum distillation through gradually lowering the pressure inside the reaction vessel and holding a final pressure in the range of 5 to 250 mbar for a period of time between 2 and 60 minutes, f) cooling down and isolating the polymeric liquid material thus obtained, with the provision that at least one of the optional steps a1) and c1) is carried out and that stirring is carried out for at least 30 minutes after the last one of said adding steps.

9. The method according to claim 8, wherein step a) comprises carrying out steps a1), and optionally a2), followed optionally by step e), and followed by step f).

10. The method according to claim 8, wherein step a) does not comprise carrying out steps a1) and a2) and wherein step c) is carried out.

11. The method according to claim 8, wherein the reaction temperature for steps b) through e) is in the range from 70° C. to 170° C., and the pressure during steps b) through d) is in the range of 0.1 bar to 2 bar.

12. The method according to claim 8, wherein acetic acid ester reaction products are removed from the system through a distillation column comprising several theoretical plates in such a way that the lower boiling reaction product is separated from higher boiling residual reactants in solution whereby the latter are continuously fed back into the reaction mixture.

13. The method according to claim 8, wherein:
the catalyst is selected from the group of Ti(OR")$_4$ and Zn(II) alkanolates Zn(OR")$_2$, wherein R" is —CH$_2$CH$_3$, —CH(CH$_3$)$_2$, —CH$_2$CH$_2$CH$_3$, —C(CH$_3$)$_3$, or —CH$_2$CH$_2$CH$_2$CH$_3$;
the catalyst is a dibutyl-tin(IV) compound, or
the catalyst is Ti(O—Si(CH$_3$)$_3$)$_4$,
wherein the catalyst amount added in each of steps a) or c) is between 0.01 and 1.5% on a mol basis of total alkoxysilane precursor used in said step.

14. The polymeric liquid material according to claim 5, comprising at least one T-type species alkoxy terminated siloxane moiety having an R' that is Rs or that is selected from vinyl, methacrylate, butacrylate, and acrylate, with a content of the polymeric liquid material in the range of 0.2% to 25% by weight with respect to the formulation.

15. The polymeric liquid material according to claim 1, wherein at least one T-type alkoxy terminated siloxane moiety having an R' selected from methyl, ethyl, vinyl, methacrylate, n-propyl, isopropyl, n-butyl, t-butyl, hexyl, octyl, dodecyl, hexadecyl, (3,3,3-trifluoro) propyl, (1H,1H, 2H, 2H-perfluoro) octyl, (1H,1H, 2H, 2H-perfluoro) dodecyl, and (1H,1H, 2H, 2H-perfluoro) hexadecyl, in a hydrophobic formulation, wherein the loading of the polymeric liquid, hydrolysis product or emulsion in the formulation is 0.5% to 25% by weight.

16. The polymeric liquid material according to claim 1, wherein the material contains R1-,R2-substituted di-organofunctional D-type siloxane moieties

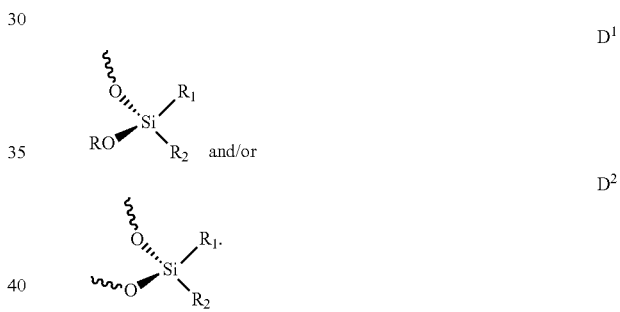

17. The polymeric liquid material according to claim 16, wherein the total content of terminally bonded di-organofunctional D-type siloxane moieties in the material is zero.

* * * * *